United States Patent
Momose et al.

(10) Patent No.: US 7,727,418 B2
(45) Date of Patent: Jun. 1, 2010

(54) INFRARED TRANSMISSIVE THERMOPLASTIC COMPOSITION, AND ARTICLES FORMED THEREFROM

(75) Inventors: Masayuki Momose, Tochigi-ken (JP); Atsushi Todokoro, Tochigi-ken (JP)

(73) Assignee: Sabic Innovative Plastics IP B.V. (NL)

( * ) Notice: Subject to any disclaimer, the term of this patent is extended or adjusted under 35 U.S.C. 154(b) by 1000 days.

(21) Appl. No.: 11/424,965

(22) Filed: Jun. 19, 2006

(65) Prior Publication Data

US 2007/0290172 A1    Dec. 20, 2007

(51) Int. Cl.
C09K 11/06 (2006.01)
C09K 11/00 (2006.01)

(52) U.S. Cl. .................. 252/301.16; 428/412

(58) Field of Classification Search ............ 252/301.16; 428/412
See application file for complete search history.

(56) References Cited

U.S. PATENT DOCUMENTS

| | | | |
|---|---|---|---|
| 3,803,085 A | 4/1974 | Takekhoshi et al. |
| 3,847,867 A | 11/1974 | Heath et al. |
| 3,850,885 A | 11/1974 | Takekhoshi et al. |
| 3,852,242 A | 12/1974 | White |
| 3,855,178 A | 12/1974 | White et al. |
| 3,905,942 A | 9/1975 | Takekhoshi et al. |
| 3,972,902 A | 8/1976 | Heath et al. |
| 3,983,093 A | 9/1976 | Williams et al. |
| 4,039,467 A | 8/1977 | Tucker |
| 4,443,591 A | 4/1984 | Schmidt et al. |
| 4,455,410 A | 6/1984 | Giles |
| 4,609,997 A | 9/1986 | Matsuyama |
| 4,760,118 A | 7/1988 | White et al. |
| 4,808,686 A | 2/1989 | Cella et al. |
| 5,200,851 A | 4/1993 | Coderre et al. |
| 5,280,085 A | 1/1994 | Rock et al. |
| 6,306,978 B1 | 10/2001 | Braat et al. |
| 6,537,673 B2 | 3/2003 | Sada et al. |
| 2003/0125429 A1 | 7/2003 | Joachimi et al. |
| 2004/0152806 A1 | 8/2004 | Koga et al. |
| 2005/0215750 A1 | 9/2005 | Koga et al. |

FOREIGN PATENT DOCUMENTS

| | | |
|---|---|---|
| EP | 0331276 | 9/1989 |
| EP | 0719654 | 7/1996 |

OTHER PUBLICATIONS

International Search Report for International Application No. PCT/US2007/067452, mailed Sep. 6, 2007, 5 pages.
Written Opinion for International Search Report for International Application No. PCT/US2007/067452, mailed Sep. 6, 2007, 6 pages.
ASTM D1003-00 "Standard Test Method for Haze and Luminous Transmittance of Transparent Plastics" Jun. 10, 2000, 6 pages.
ASTM E1331-04 "Standard Test Method for Reflectance Factor and Color by Spectrophotometry Using Hemisperical Geometry" Jun. 1, 2004, 4 pages.
Japanese Patent No. JP54159453 published Dec. 17, 1979, abstract only.
Japanese Patent No. JP6194516 published Jul. 15, 1994, abstract only.

*Primary Examiner*—Duc Truong
(74) *Attorney, Agent, or Firm*—Cantor Colburn LLP

(57) ABSTRACT

A thermoplastic composition is disclosed herein, comprising a thermoplastic polymer, and a dye combination comprising a black dye, and a fluorescent dye, wherein a molded article having a thickness of 2.0 millimeters and consisting of the thermoplastic polymer, the black dye, and the fluorescent dye, has a percent transmission of infrared light according to ASTM D1003-00 of greater than or equal to 50%, when measured at a wavelength of 800 to 1,100 nm, and a percent transmission of visible light, according to ASTM D1003-00 of less than or equal to 15%, when measured at a wavelength of 400 to 650 nm. An article comprising the thermoplastic composition is also disclosed.

24 Claims, 2 Drawing Sheets

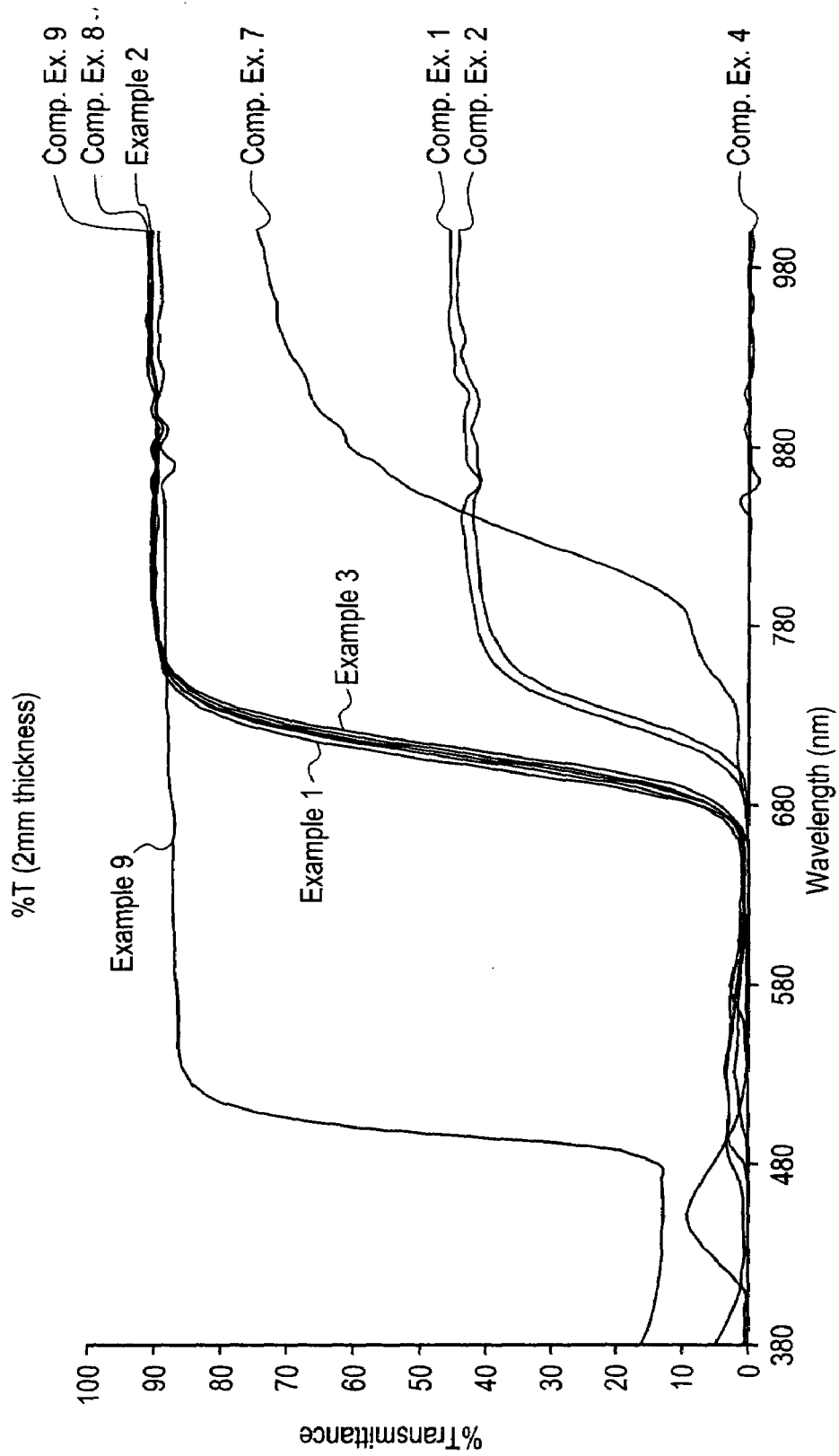

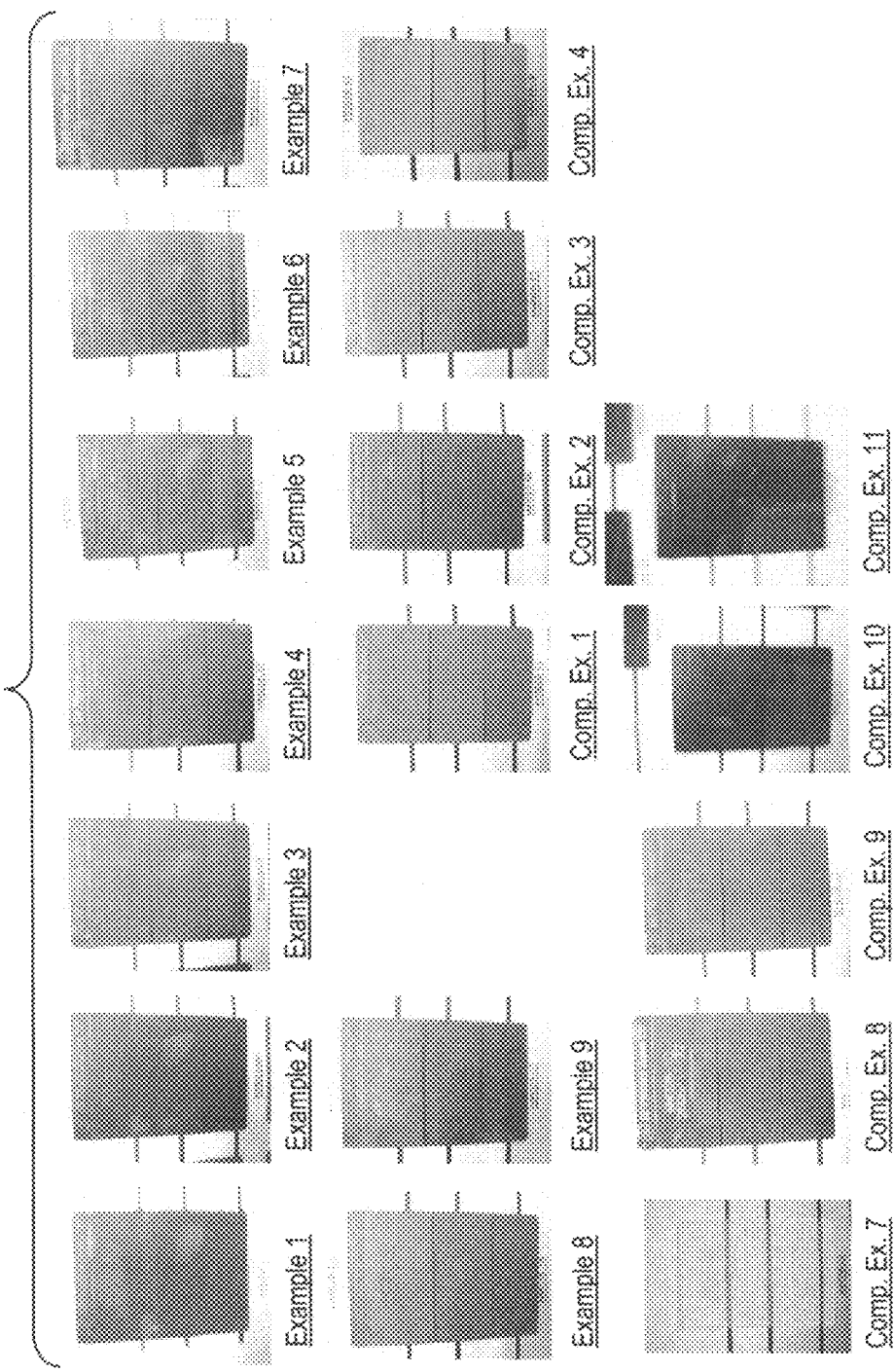

1

INFRARED TRANSMISSIVE THERMOPLASTIC COMPOSITION, AND ARTICLES FORMED THEREFROM

BACKGROUND OF THE INVENTION

This disclosure relates to infrared transmissive thermoplastic compositions, articles formed therefrom, and uses thereof.

The increased variety of small, portable electronic devices has led to a commensurately increased need to adapt the aesthetic form of such devices to the desired functions they provide. For devices such as calculators, television remote controls, multi-functional cellular telephones, personal digital assistants (PDA's), laptop computers, wireless mouses, computer keyboards, and other similar items, signal and/or data information transfer between the device and a complementary device (such as between an optical mouse and computer) is generally accomplished by using either a radio frequency broadcast signal between the devices, or more commonly line-of-sight infrared signal transmitted between the devices. The latter is useful for short-range inter-device communication.

Devices that communicate via transmitted infrared signals require both a transmission source and/or a receiver in each device. Since typical materials of construction of the cases for such devices have a variety of fillers, additives, and are formed from a variety of different thermoplastics, the transmissivity of the cases is not typically high enough to permit the placement of the infrared source and receiver within the case. Optical windows that are transparent in the infrared are frequently used to provide an optical pathway into and out of the casing in such devices. Typically, the optical windows are formed from an infrared-transparent plastic material with low light scattering properties, and may be clear or opaque. It is desirable for these windows absorb visible light (i.e., to be opaque to the eye), to filter out the effects of stray light. However, to provide the desired absorbance, the windows are generally dark in color (red to black), which can give the device an appearance that may not be aesthetically appealing, and which can have limited decorative capability.

There accordingly remains a need in the art for thermoplastic compositions for use in infrared transmissive windows or other infrared transmissive applications, which have improved appearance while maintaining the desired light transmissive properties for infrared and visible light.

SUMMARY OF THE INVENTION

The above deficiencies in the art are alleviated by, in an embodiment, a thermoplastic composition comprises a thermoplastic polymer, and a dye combination comprising a black dye and a fluorescent dye, wherein a molded article having a thickness of 2.0 millimeters and consisting of the thermoplastic polymer, the black dye, and the fluorescent dye, has a percent transmission of infrared light according to ASTM D1003-00 of greater than or equal to 50%, when measured at a wavelength of 800 to 1,100 nm, and a percent transmission of visible light, according to ASTM D1003-00 of less than or equal to 15%, when measured at a wavelength of 400 to 650 nm, and wherein a molded article consisting of the thermoplastic polymer, black dye, and fluorescent dye has, when measured according to ASTM E1331-04, a percent reflectance (% R) of greater than 7% at a wavelength of 400 to 650 nm.

In another embodiment, a thermoplastic composition consists essentially of a thermoplastic polymer, and a dye combination comprising a black dye and a fluorescent dye, wherein a molded article having a thickness of 2.0 millimeters and consisting of the thermoplastic polymer, the black dye, and the fluorescent dye, has a percent transmission of infrared light according to ASTM D1003-00 of greater than or equal to 50%, when measured at a wavelength of 800 to 1,100 nm, and a percent transmission of visible light, according to ASTM D1003-00 of less than or equal to 15%, when measured at a wavelength of 400 to 650 nm, and wherein a molded article consisting of the thermoplastic polymer, black dye, and fluorescent dye has, when measured according to ASTM E1331-04, a percent reflectance (% R) of greater than 7% at a wavelength of 400 to 650 nm.

In another embodiment, a thermoplastic composition comprises a polycarbonate, and a dye combination comprising a black dye and a fluorescent dye, wherein a molded article having a thickness of 2.0 millimeters and consisting of the polycarbonate, the black dye, and the fluorescent dye, has a percent transmission of infrared light according to ASTM D1003-00 of greater than or equal to 50%, when measured at a wavelength of 800 to 1,100 nm, and a percent transmission of visible light, according to ASTM D1003-00 of less than or equal to 15%, when measured at a wavelength of 400 to 650 nm, and wherein a molded article consisting of the polycarbonate, black dye, and fluorescent dye has, when measured according to ASTM E1331-04, a percent reflectance (% R) of greater than 7% at a wavelength of 400 to 650 nm.

In another embodiment, a thermoplastic composition comprises 50 to 99.98 wt % of a thermoplastic polymer, 0.01 to 25 wt % of a black dye, and 0.01 to 25 wt % of a fluorescent dye, based on the total weight of the thermoplastic polymer, black dye, and fluorescent dye, and wherein the sum of the weight percentages of each of these is 100 wt %, and wherein a molded article having a thickness of 2.0 millimeters and consisting of the thermoplastic polymer, the black dye, and the fluorescent dye, has a percent transmission of infrared light according to ASTM D1003-00 of greater than or equal to 50%, when measured at a wavelength of 800 to 1,100 nm, and a percent transmission of visible light, according to ASTM D1003-00 of less than or equal to 15%, when measured at a wavelength of 400 to 650 nm, and wherein a molded article consisting of the thermoplastic polymer, black dye, and fluorescent dye has, when measured according to ASTM E1331-04, a percent reflectance (% R) of greater than 7% at a wavelength of 400 to 650 nm.

In another embodiment, an article comprises a thermoplastic polymer, and a dye combination comprising a black dye and a fluorescent dye, wherein a molded article having a thickness of 2.0 millimeters and consisting of the thermoplastic polymer, the black dye, and the fluorescent dye, has a percent transmission of infrared light according to ASTM D1003-00 of greater than or equal to 50%, when measured at a wavelength of 800 to 1,100 nm, and a percent transmission of visible light, according to ASTM D1003-00 of less than or equal to 15%, when measured at a wavelength of 400 to 650 nm, and wherein a molded article consisting of the thermoplastic polymer, black dye, and fluorescent dye has, when measured according to ASTM E1331-04, a percent reflectance (% R) of greater than 7% at a wavelength of 400 to 650 nm.

A description of the figures, which are meant to be exemplary and not limiting, is provided below.

BRIEF DESCRIPTION OF THE FIGURES

FIG. 1 is an overlaid spectral plot of wavelength vs. % transmittance for selected examples and comparative examples.

FIG. 2 is a set of color photographs of the plaques prepared using the thermoplastic compositions of the examples and comparative examples.

The above described and other features are exemplified by the following detailed description.

DETAILED DESCRIPTION OF THE INVENTION

Surprisingly, it has been found that a thermoplastic composition comprising an infrared transmissive thermoplastic polymer, an infrared transmissive non-fluorescent dye having a black color, and a fluorescent dye, has high infrared transmissivity, low visible light transmissivity, and has an aesthetically desirable colored appearance and surface finish. A molded article having a thickness of 2.0 millimeters (mm) and consisting of the infrared transmissive thermoplastic composition has a high infrared light transmission (% T) of greater than 50% at a wavelength of 800 to 1,100 nanometers (nm) as measured according to ASTM D1003-00. A molded article having a thickness of 2.0 millimeters (mm) and consisting of the infrared transmissive thermoplastic composition further has a visible light transmission of less than or equal to 15% at a wavelength of 400 to 650 nm, as measured according to ASTM D1003-00. Articles prepared from the thermoplastic composition further have low reflectivity and excellent aesthetic appearance.

As used herein, the term "hydrocarbyl" refers to a straight or branched chain, substituted or unsubstituted hydrocarbon group including aromatic and/or aliphatic groups; the term "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkylene" refers to a non-aromatic alicyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to a an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups may be unsubstituted or substituted, provided that the substitution does not significantly adversely affect synthesis, stability, or use of the compound. The term "substituted" as used herein means that any one or more hydrogens on the designated atom or group are replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound.

The thermoplastic composition disclosed herein contains one or more thermoplastic polymers. Types of thermoplastic polymers that are useful comprise polycarbonates, including homopolycarbonates, copolycarbonates, polyester-polycarbonates, and polysiloxane-polycarbonates; polyesters including poly(alkylene terephthalate); polyetherimides; polysiloxane-polyetherimides; polyphenylene ethers; polyolefins; addition polymers, including homopolymers and copolymers, especially homopolymers of alkenylaromatic compounds, such as polystyrenes, and copolymers of alkenylaromatic compounds, such as impact modified poly(alkenylaromatic) copolymers with ethylenically unsaturated nitriles, and poly(meth)acrylates.

The thermoplastic composition can include a polycarbonate. As used herein, the terms "polycarbonate" and "polycarbonate resin" mean compositions having repeating structural carbonate units of the formula (1):

in which at least 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—R$^1$—OH, which includes dihydroxy compounds of formula (3)

  (3)

wherein Y$^1$, A$^1$ and A$^2$ are as described above. Also included are bisphenol compounds of general formula (4):

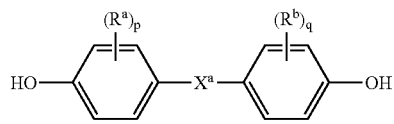 (4)

wherein R$^a$ and R$^b$ each represent a halogen atom or a monovalent hydrocarbon group and may be the same or different; p and q are each independently integers of 0 to 4; and X$^a$ represents one of the groups of formula (5):

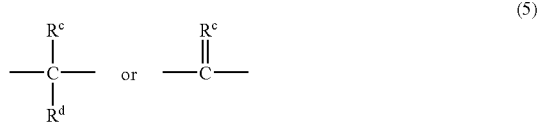 (5)

wherein R$^c$ and R$^d$ each independently represent a hydrogen atom or a monovalent linear or cyclic hydrocarbon group and R$^e$ is a divalent hydrocarbon group.

In an embodiment, a heteroatom-containing cyclic alkylidene group comprises at least one heteroatom with a valency of 2 or greater, and at least two carbon atoms. Heteroatoms for use in the heteroatom-containing cyclic alkylidene group include —O—, —S—, and —N(Z)—, where Z is a substituent group selected from hydrogen, hydroxy, C$_{1-12}$ alkyl, C$_{1-12}$ alkoxy, or C$_{1-12}$ acyl. Where present, the cyclic alkylidene group or heteroatom-containing cyclic alkylidene group may have 3 to 20 atoms, and may be a single saturated or unsaturated ring, or fused polycyclic ring system wherein the fused rings are saturated, unsaturated, or aromatic.

Other bisphenols containing substituted or unsubstituted cyclohexane units can be used, for example bisphenols of formula (6):

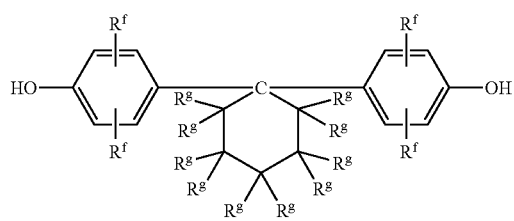 (6)

wherein each R$^f$ is independently hydrogen, C$_{1-12}$ alkyl, or halogen; and each R$^g$ is independently hydrogen or C$_{1-12}$ alkyl. The substituents may be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC® trade name.

Other useful dihydroxy compounds having the formula HO—R$^1$—OH include aromatic dihydroxy compounds of formula (7):

 (7)

wherein each R$^h$ is independently a halogen atom, a C$_{1-10}$ hydrocarbyl such as a C$_{1-10}$ alkyl group, a halogen substituted C$_{1-10}$ hydrocarbyl such as a halogen-substituted C$_{1-10}$ alkyl group, and n is 0 to 4. The halogen is usually bromine.

Exemplary dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that may be represented by formula (3) include 1,1-bis(4-hydroxyphenyl) methane, 1,1-bis(4-hydroxyphenyl) ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl) n-butane, 2,2-bis(4-hydroxy-1-methylphenyl)propane, 1,1-bis(4-hydroxy-t-butylphenyl)propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds may also be used.

In a specific embodiment, the polycarbonate is a linear homopolymer derived from bisphenol A, in which each of $A^1$ and $A^2$ is p-phenylene and $Y^1$ is isopropylidene. The polycarbonates may have an intrinsic viscosity, as determined in chloroform at 25° C., of 0.3 to 1.5 deciliters per gram (dl/g), specifically 0.45 to 1.0 dl/g. The polycarbonates may have a weight average molecular weight (Mw) of 10,000 to 100,000, as measured by gel permeation chromatography (GPC) using a crosslinked styrene-divinyl benzene column, at a sample concentration of 1 milligram per milliliter, and as calibrated with polycarbonate standards.

In an embodiment, the polycarbonate has a melt volume flow rate (often abbreviated MVR) measures the rate of extrusion of a thermoplastics through an orifice at a prescribed temperature and load. Polycarbonates useful for the formation of thin articles may have an MVR, measured at 300° C. under a load of 1.2 kg according to ASTM D1238-04, of 0.5 to 80 cubic centimeters per 10 minutes (cc/10 min). In a specific embodiment, a useful polycarbonate composition has an MVR measured at 300° C. under a load of 1.2 kg according to ASTM D1238-04, of 0.5 to 50 cc/10 min, specifically 0.5 to 25 cc/10 min, and more specifically 1 to 15 cc/10 min. Mixtures of polycarbonates of different flow properties may be used to achieve the overall desired flow property.

The polycarbonate may have a light transmittance greater than or equal to 55%, specifically greater than or equal to 60% and more specifically greater than or equal to 70%, as measured using a molded article of 3.2±0.12 millimeters thickness and consisting of the polycarbonate, according to ASTM D1003-00. The polycarbonate may also have a haze less than or equal to 5%, specifically less than or equal to 4%, and most specifically less than or equal to 3%, as measured using a molded article of 3.2±0.12 millimeters thickness and consisting of the polycarbonate, according to ASTM D1003-00.

"Polycarbonates" and "polycarbonate resins" as used herein further include homopolycarbonates, copolymers comprising different $R^1$ moieties in the carbonate (referred to herein as "copolycarbonates"), copolymers comprising carbonate units and other types of polymer units, such as ester units, polysiloxane units, and combinations comprising at least one of homopolycarbonates and copolycarbonates. As used herein, "combination" is inclusive of blends, mixtures, alloys, reaction products, and the like. A specific type of copolymer is a polyester carbonate, also known as a polyester-polycarbonate. Such copolymers further contain, in addition to recurring carbonate chain units of the formula (1), repeating units of formula (8):

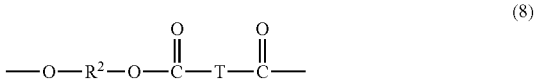

wherein $R^2$ is a divalent group derived from a dihydroxy compound, and may be, for example, a $C_{2-10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms; and T divalent group derived from a dicarboxylic acid, and may be, for example, a $C_{2-10}$ alkylene group, a $C_{6-20}$ alicyclic group, a $C_{6-20}$ alkyl aromatic group, or a $C_{6-20}$ aromatic group.

In an embodiment, $R^2$ is a $C_{2-30}$ alkylene group having a straight chain, branched chain, or cyclic (including polycyclic) structure. In another embodiment, $R^2$ is derived from an aromatic dihydroxy compound of formula (4) above. In another embodiment, $R^2$ is derived from an aromatic dihydroxy compound of formula (7) above.

Examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98. In another specific embodiment, $R^2$ is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers may vary broadly, for example 1:99 to 99:1, specifically 10:90 to 90:10, more specifically 25:75 to 75:25, depending on the desired properties of the final composition.

In a specific embodiment, the polyester unit of a polyester-polycarbonate may be derived from the reaction of a combination of isophthalic and terephthalic diacids (or derivatives thereof) with resorcinol. In another specific embodiment, the polyester unit of a polyester-polycarbonate is derived from the reaction of a combination of isophthalic acid and terephthalic acid with bisphenol-A. In a specific embodiment, the polycarbonate units are derived from bisphenol A. In another specific embodiment, the polycarbonate units are derived from resorcinol and bisphenol A in a molar ratio of resorcinol carbonate units to bisphenol A carbonate units of 1:99 to 99:1.

Polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like.

Carbonate precursors include, for example, a carbonyl halide such as carbonyl bromide or carbonyl chloride, or a haloformate such as a bishaloformate of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. In an exemplary embodiment, an interfacial polymerization reaction to form carbonate linkages uses phosgene as a carbonate precursor, and is referred to as a phosgenation reaction.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Useful phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. An effective amount of a phase transfer catalyst may be about 0.1 to about 10 wt % based on the weight of bisphenol in the phosgenation mixture. In another embodiment an effective amount of phase transfer catalyst may be about 0.5 to about 2 wt % based on the weight of bisphenol in the phosgenation mixture.

All types of polycarbonate end groups are contemplated as being useful in the polycarbonate composition, provided that such end groups do not significantly adversely affect desired properties of the compositions.

Branched polycarbonate blocks may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents may be added at a level of about 0.05 to about 2.0 wt %. Mixtures comprising linear polycarbonates and branched polycarbonates may be used.

A chain stopper (also referred to as a capping agent) may be included during polymerization. The chain-stopper limits molecular weight growth rate, and so controls molecular weight in the polycarbonate. Exemplary chain-stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom may be specifically mentioned. Certain mono-phenolic UV absorbers may also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides may also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing. In addition, transesterification catalysts for use may include phase transfer catalysts of formula $(R^3)_4Q^+X$ above, wherein each $R^3$, Q, and X are as defined above. Examples of transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

The polyester-polycarbonates may also be prepared by interfacial polymerization. Rather than utilizing the dicarboxylic acid per se, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, or a combination comprising at least one of the foregoing, it is possible to employ isophthaloyl dichloride, terephthaloyl dichloride, and a combination comprising at least one of the foregoing.

In addition to the polycarbonates described above, combinations of the polycarbonate with other thermoplastic polymers, for example combinations of homopolycarbonates and/or polycarbonate copolymers with polyesters, may be used. Useful polyesters may include, for example, polyesters having repeating units of formula (8), which include poly(alkylene dicarboxylates), liquid crystalline polyesters, and polyester copolymers. The polyesters described herein are generally completely miscible with the polycarbonates when blended.

The polyesters may be obtained by interfacial polymerization or melt-process condensation as described above, by solution phase condensation, or by transesterification polymerization wherein, for example, a dialkyl ester such as dimethyl terephthalate may be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the polyester, depending on the ultimate end use of the composition.

Useful polyesters may include aromatic polyesters, poly (alkylene esters) including poly(alkylene arylates), and poly (cycloalkylene diesters). Aromatic polyesters may have a polyester structure according to formula (8), wherein D and T are each aromatic groups as described hereinabove. In an embodiment, useful aromatic polyesters may include, for example, poly(isophthalate-terephthalate-resorcinol) esters, poly(isophthalate-terephthalate-bisphenol-A)esters, poly [(isophthalate-terephthalate-resorcinol)ester-co-(isophthalate-terephthalate-bisphenol-A)] ester, or a combination comprising at least one of these. Also contemplated are aromatic polyesters with a minor amount, e.g., about 0.5 to about 10 wt %, based on the total weight of the polyester, of units derived from an aliphatic diacid and/or an aliphatic polyol to make copolyesters. Poly(alkylene arylates) may have a polyester structure according to formula (8), wherein T comprises groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups D include, for example, ethylene, 1,4-butylene, and bis-(alkylene-disubstituted cyclohexane) including cis- and/or trans-1,4-(cyclohexylene) dimethylene. Examples of poly(alkylene terephthalates) include poly(ethylene terephthalate) (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A useful poly(cycloalkylene diester) is poly (cyclohexanedimethylene terephthalate) (PCT). Combinations comprising at least one of the foregoing polyesters may also be used.

Copolymers comprising alkylene terephthalate repeating ester units with other ester groups may also be useful. Useful ester units may include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s may also include poly(alkylene cyclohexanedicarboxylate)s. Of these, a specific example is poly(1,4-cyclohexane-dimethanol-1,4-cyclohexanedicarboxylate) (PCCD), having recurring units of formula (9):

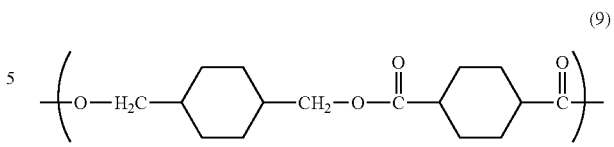

wherein, as described using formula (8), $R^2$ is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination comprising at least one of the foregoing isomers.

The polycarbonate and polyester and/or polyester-polycarbonate may be used in a weight ratio of 1:99 to 99:1, specifically 10:90 to 90:10, and more specifically 30:70 to 70:30, depending on the function and properties desired.

The polyester-polycarbonates may have a weight-averaged molecular weight ($M_w$) of 1,500 to 100,000, specifically 1,700 to 50,000, and more specifically 2,000 to 40,000. Molecular weight determinations are performed using gel permeation chromatography (GPC), using a crosslinked styrene-divinylbenzene column and calibrated to polycarbonate references. Samples are prepared at a concentration of about 1 mg/ml, and are eluted at a flow rate of about 1.0 ml/min.

Where used, it is desirable for a polyester-polycarbonate to have an MVR of about 5 to about 150 cc/10 min., specifically about 7 to about 125 cc/10 min, more specifically about 9 to about 110 cc/10 min, and still more specifically about 10 to about 100 cc/10 min., measured at 300° C. and a load of 1.2 kilograms according to ASTM D1238-04. Commercial polyester blends with polycarbonate are marketed under the trade name XYLEX®, including for example XYLEX® X7300, and commercial polyester-polycarbonates are marketed under the tradename LEXAN® SLX polymers, including for example LEXAN® SLX-9000, and are available from GE Plastics.

The thermoplastic composition may also comprise a polysiloxane-polycarbonate copolymer, also referred to as a polysiloxane-polycarbonate. The polysiloxane (also referred to herein as "polydiorganosiloxane") blocks of the copolymer comprise repeating siloxane units (also referred to herein as "diorganosiloxane units") of formula (10):

wherein each occurrence of R is same or different, and is a $C_{1-13}$ monovalent organic radical. For example, R may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups may be fully or partially halogenated with fluorine, chlorine, bromine, or iodine, or a combination thereof. Combinations of the foregoing R groups may be used in the same copolymer.

The value of D in formula (10) may vary widely depending on the type and relative amount of each component in the thermoplastic composition, the desired properties of the composition, and like considerations. Generally, D may have an average value of 2 to 1,000, specifically 2 to 500, and more specifically 5 to 100. In one embodiment, D has an average value of 10 to 75, and in still another embodiment, D has an average value of 40 to 60. Where D is of a lower value, e.g., less than 40, it may be desirable to use a relatively larger amount of the polycarbonate-polysiloxane copolymer. Conversely, where D is of a higher value, e.g., greater than 40, it may be necessary to use a relatively lower amount of the polycarbonate-polysiloxane copolymer.

A combination of a first and a second (or more) polysiloxane-polycarbonate copolymer may be used, wherein the average value of D of the first copolymer is less than the average value of D of the second copolymer.

In one embodiment, the polydiorganosiloxane blocks are provided by repeating structural units of formula (11):

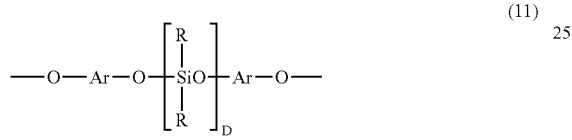

wherein D is as defined above; each R may independently be the same or different, and is as defined above; and each Ar may independently be the same or different, and is a substituted or unsubstituted $C_6$-$C_{30}$ arylene radical, wherein the bonds are directly connected to an aromatic moiety. Useful Ar groups in formula (11) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of dihydroxyarylene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl) butane, 2,2-bis(4-hydroxyphenyl)octane, 1,1-bis(4-hydroxyphenyl) propane, 1,1-bis(4-hydroxyphenyl) n-butane, 2,2-bis(4-hydroxy-1-methylphenyl)propane, 1,1-bis(4-hydroxyphenyl) cyclohexane, bis(4-hydroxyphenyl sulphide), and 1,1-bis(4-hydroxy-t-butylphenyl)propane. Combinations comprising at least one of the foregoing dihydroxy compounds may also be used.

Units of formula (11) may be derived from the corresponding dihydroxy compound of formula (12):

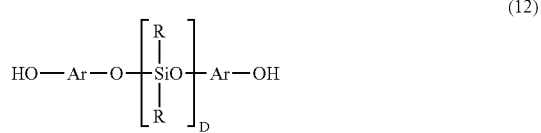

wherein R, Ar, and D are as described above. Compounds of formula (12) may be obtained by the reaction of a dihydroxyarylene compound with, for example, an alpha, omega-bisacetoxypolydiorangonosiloxane under phase transfer conditions.

In another embodiment, polydiorganosiloxane blocks comprise units of formula (13):

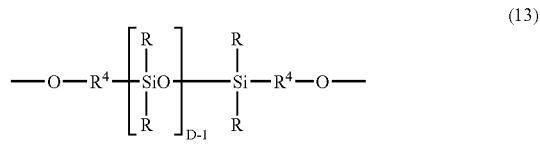

wherein R and D are as described above, and each occurrence of $R^4$ is independently a divalent $C_1$-$C_{30}$ alkylene, and wherein the polymerized polysiloxane unit is the reaction residue of its corresponding dihydroxy compound. In a specific embodiment, the polydiorganosiloxane blocks are provided by repeating structural units of formula (14):

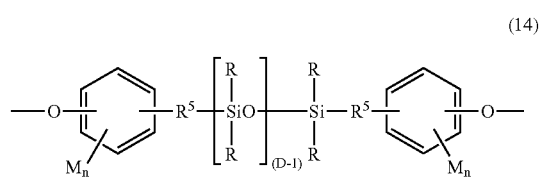

wherein R and D are as defined above. Each $R^5$ in formula (14) is independently a divalent $C_2$-$C_8$ aliphatic group. Each M in formula (14) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^5$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^5$ is a divalent $C_1$-$C_3$ aliphatic group, and R is methyl.

Units of formula (14) may be derived from the corresponding dihydroxy polydiorganosiloxane (15):

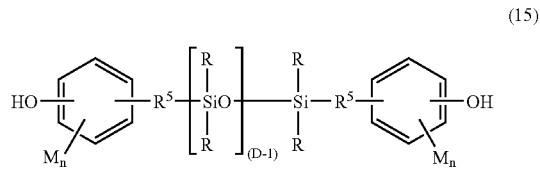

wherein R, D, M, $R^5$, and n are as described above. Such dihydroxy polysiloxanes can be made by effecting a platinum catalyzed addition between a siloxane hydride of formula (16):

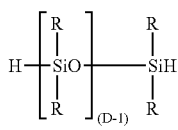

wherein R and D are as previously defined, and an aliphatically unsaturated monohydric phenol. Useful aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The polysiloxane-polycarbonate may comprise 50 to 99 wt % of carbonate units and 1 to 50 wt % siloxane units. Within this range, the polysiloxane-polycarbonate copolymer may comprise 70 to 98 wt %, specifically 75 to 97 wt % of carbonate units and 2 to 30 wt %, specifically 3 to 25 wt % siloxane units.

In an embodiment, the polysiloxane-polycarbonate may comprise polysiloxane units, and carbonate units derived from bisphenol A, e.g., the dihydroxy compound of formula (3) in which each of $A^1$ and $A^2$ is p-phenylene and $Y^1$ is isopropylidene. Polysiloxane-polycarbonates may have a weight average molecular weight of 2,000 to 100,000, specifically 5,000 to 50,000 as measured by gel permeation chromatography using a crosslinked styrene-divinyl benzene column, at a sample concentration of 1 milligram per milliliter, and as calibrated with polycarbonate standards.

The polysiloxane-polycarbonate can have a melt volume flow rate, measured at 300° C. under a load of 1.2 kg, of 1 to 50 cubic centimeters per 10 minutes (cc/10 min), specifically 2 to 30 cc/10 min. Mixtures of polysiloxane-polycarbonates of different flow properties may be used to achieve the overall desired flow property. In an embodiment, exemplary polysiloxane-polycarbonates are marketed under the trade name LEXAN® EXL polycarbonates, available from GE Plastics.

The thermoplastic composition can comprise a poly(arylene ether). As used herein, a "poly(arylene ether)" comprises a plurality of structural units of the formula (17):

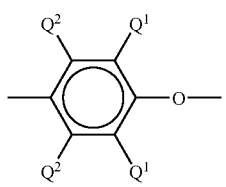

wherein for each structural unit, each $Q^1$ and $Q^2$ is independently hydrogen, halogen, primary or secondary lower alkyl (e.g., an alkyl containing 1 to about 7 carbon atoms), phenyl, haloalkyl, aminoalkyl, alkenylalkyl, alkynylalkyl, hydrocarbonoxy, aryl and halohydrocarbonoxy wherein at least two carbon atoms separate the halogen and oxygen atoms. In some embodiments, each $Q^1$ is independently alkyl or phenyl, for example, $C_{1-4}$ alkyl, and each $Q^2$ is independently hydrogen or methyl. The poly(arylene ether) may comprise molecules having aminoalkyl-containing end group(s), typically located in an ortho position to the hydroxy group. Also frequently present are tetramethyl diphenylquinone (TMDQ) end groups, typically obtained from reaction mixtures in which tetramethyl diphenylquinone by-product is present.

The poly(arylene ether) may be in the form of a homopolymer; a copolymer; a graft copolymer; an ionomer; or a block copolymer; as well as combinations comprising at least one of the foregoing. Poly(arylene ether) includes polyphenylene ether comprising 2,6-dimethyl-1,4-phenylene ether units optionally in combination with 2,3,6-trimethyl-1,4-phenylene ether units.

The poly(arylene ether) may be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

In one embodiment, the poly(arylene ether) comprises a capped poly(arylene ether). The capping may be used to reduce the oxidation of terminal hydroxy groups on the poly(arylene ether) chain. The terminal hydroxy groups may be deactivated by capping with a deactivating capping agent via an acylation reaction, for example. The capping agent chosen is desirably one that results in a less reactive poly(arylene ether) thereby reducing or preventing crosslinking of the polymer chains and the formation of gels or black specks during processing at elevated temperatures. Useful capping agents include, for example, esters of salicylic acid, anthranilic acid, or a substituted derivative thereof, and the like; esters of salicylic acid, and especially salicylic carbonate and linear polysalicylates, are preferred. As used herein, the term "ester of salicylic acid" includes compounds in which the carboxy group, the hydroxy group, or both have been esterified. Useful salicylates include, for example, aryl salicylates such as phenyl salicylate, acetylsalicylic acid, salicylic carbonate, and polysalicylates, including both linear polysalicylates and cyclic compounds such as disalicylide and trisalicylide. The preferred capping agents are salicylic carbonate and the polysalicylates, especially linear polysalicylates. When capped, the poly(arylene ether) may be capped to any desirable less than or equal to 80 percent, more specifically less than or equal to 90 percent, and even more specifically less than or equal to 100 percent of the hydroxy groups are capped. Exemplary capped poly(arylene ether) and their preparation are described in U.S. Pat. No. 4,760,118 to White et al. and U.S. Pat. No. 6,306,978 to Braat et al. Capped poly(arylene ether)s are more stable to high temperatures, thereby resulting in fewer degradative products, such as gels or black specks, during processing of the poly(arylene ether).

The poly(arylene ether) may be functionalized with a polyfunctional compound such as a polycarboxylic acid or those compounds having in the molecule both (a) a carbon-carbon double bond or a carbon-carbon triple bond and b) at least one carboxylic acid, anhydride, amide, ester, imide, amino, epoxy, orthoester, or hydroxy group. Examples of such polyfunctional compounds include maleic acid, maleic anhydride, fumaric acid, and citric acid.

The poly(arylene ether) can have a number average molecular weight of 3,000 to 40,000 grams per mole (g/mol) and a weight average molecular weight of 5,000 to 80,000 g/mol, as determined by gel permeation chromatography using monodisperse polystyrene standards, a styrene divinyl benzene gel at 40° C. and samples having a concentration of 1 milligram per milliliter of chloroform. The poly(arylene ether) or combination of poly(arylene ether)s has an initial intrinsic viscosity of 0.08 to 0.60 deciliters per gram (dl/g), as measured in chloroform at 25° C. Initial intrinsic viscosity is defined as the intrinsic viscosity of the poly(arylene ether) prior to compounding with the other components of the composition. As understood by one of ordinary skill in the art the viscosity of the poly(arylene ether) may be up to 30% higher after compounding. The percentage of increase can be calculated by (final intrinsic viscosity−initial intrinsic viscosity)/initial intrinsic viscosity. Determining an exact ratio, when two initial intrinsic viscosities are used, will depend somewhat on the exact intrinsic viscosities of the poly(arylene ether) used and the ultimate physical properties that are desired.

Thermoplastic polyimides may also be used as soft blocks, specifically those having the general formula (18):

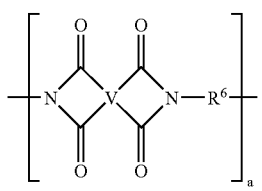

(18)

wherein a is greater than one. In an embodiment, a can be 10 to 1,000, and more specifically 10 to 500. Also in formula (18), V is a tetravalent linker without limitation, as long as the linker does not impede synthesis or use of the polyimide. Useful linkers include, but are not limited to substituted or unsubstituted, saturated, unsaturated or aromatic monocyclic and polycyclic groups having about 5 to about 50 carbon atoms; substituted or unsubstituted, linear or branched, saturated or unsaturated alkyl groups having 1 to about 30 carbon atoms; or a combination comprising at least one of the foregoing linkers. Useful substitutions and/or linkers include, but are not limited to, ethers, epoxides, amides, esters, and combinations comprising at least one of the foregoing. Exemplary linkers include, but are not limited to, tetravalent aromatic radicals of formula (19), such as:

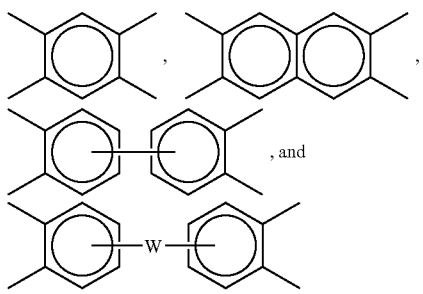

(19)

wherein W is a divalent moiety such as —O—, —S—, —C(O)—, —SO$_2$—, —SO—, —C$_y$H$_{2y}$— (y being an integer of 1 to 5), and halogenated derivatives thereof, including perfluoroalkylene groups, or a group of the Formula —O—Z—O— wherein the divalent bonds of the —O— or the —O—Z—O— group are in the 3,3', 3,4', 4,3', or the 4,4' positions, and wherein Z includes, but is not limited to, divalent radicals of formula (20):

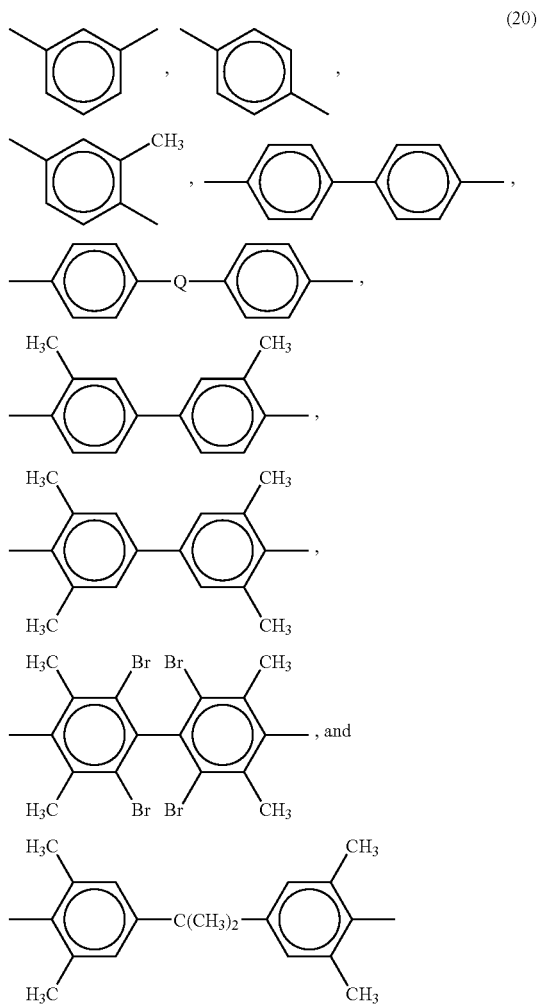

(20)

wherein Q can be a divalent moiety comprising —O—, —S—, —C(O)—, —SO$_2$—, —SO—, —C$_y$H$_{2y}$— (y being an integer from 1 to 5), and halogenated derivatives thereof, including perfluoroalkylene groups.

R$^6$ in formula (18) includes but is not limited to substituted or unsubstituted divalent organic radicals such as: aromatic hydrocarbon radicals having about 6 to about 20 carbon atoms and halogenated derivatives thereof; straight or branched chain alkylene radicals having about 2 to about 20 carbon atoms; cycloalkylene radicals having about 3 to about 20 carbon atoms; or divalent radicals of the general formula (21)

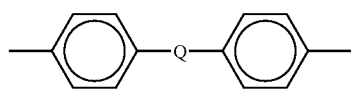

(21)

wherein Q is as defined for formulas (19).

In addition to polyimides described above, exemplary classes of polyimides also include, but are not limited to, polyamidimides, polyetherimides, polysiloxane-polyimides, and combinations comprising these. Specifically useful polyimides include those polyetherimides that are melt processable, such as those for which the preparation and properties are described in U.S. Pat. Nos. 3,803,085 and 3,905,942.

Polyetherimide resins useful herein comprise greater than 1, typically about 10 to about 1,000, and more specifically about 10 to about 500 structural units, of the formula (22):

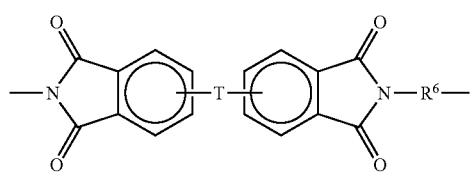

wherein T is —O— or a group of the formula —O—Z—O— wherein the divalent bonds of the —O— or the —O—Z—O— group are in the 3,3', 3,4', 4,3', or the 4,4' positions, and wherein Z and $R^6$ are defined as described above.

In one embodiment, the polyetherimide may be a copolymer (e.g., the polyetherimide siloxane) which, in addition to the etherimide units described above, further contains additional polyimide structural units of the formula (18), wherein $R^6$ is as previously defined and V includes, but is not limited to, radicals of formula (23).

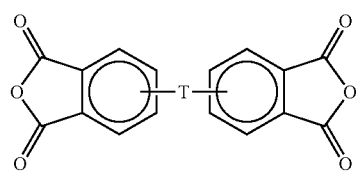

The polyetherimide can be prepared by any of a variety of methods, including the reaction of an aromatic bis(ether anhydride) of the formula (24)

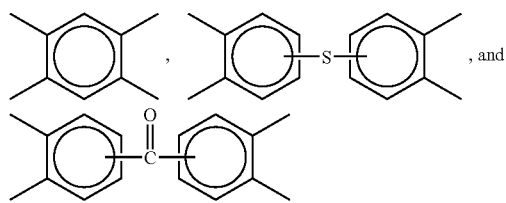

with an organic diamine of the formula (25)

$$H_2N—R^6—NH_2 \quad (25)$$

wherein $R^6$ and T are defined in relation to formulas (19) and (22), respectively.

The polyetherimide siloxane copolymer employed contains repeating groups of formula (22) and the formula (26):

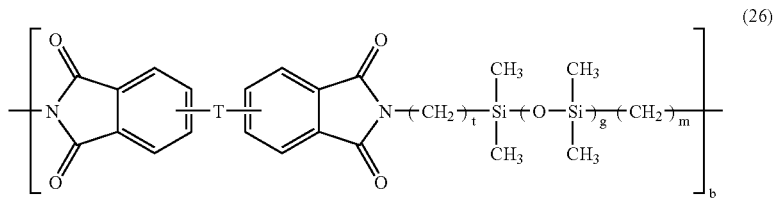

wherein "b" is an integer greater than 1, preferably 10 to 10,000 or more; T described above in relation to formula (26); $R^6$ is described above in relation to formula (19); t and m independently are integers from 1 to about 10; and g is an integer from 1 to about 40.

The polyetherimide siloxane copolymer can similarly be prepared by various methods, including the reaction of an aromatic bis(ether anhydride) of formula (24) with two or more organic diamines of formula (25), above, and formula (27):

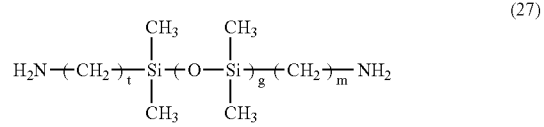

where t, m, and g, are defined as described above in relation to formula (26).

The diamine component of the polyetherimide siloxane copolymers generally contains about 10 mole percent (mole %) to about 50 mole % of the amine-terminated organosiloxane of formula (27) and about 50 to about 80 mole % of the organic diamine of formula (25). Specifically, the diamine component can contain about 25 mole % to about 40 mole %, most preferably about 35 mole % of the amine-terminated organosiloxane, based upon the total mole % of the copolymer. Examples of polyetherimide siloxanes can be found, for example, in U.S. Pat. Nos. 4,609,997, 4,808,686, and 5,280,085.

Where two or more diamines are used, the diamines may be physically mixed prior to reaction with the bis(ether anhydride)(s), thus forming a substantially random copolymer. Alternatively, block or alternating copolymers may be formed by forming prepolymers or by sequential addition of reactants. In addition, the polyimides of formula (19) and the polyetherimides of formula (22) may be copolymerized with other polymers including, for example, polysiloxanes, polyesters, polycarbonates, polyacrylates, fluoropolymers, and the like.

Examples of specific aromatic bis(ether anhydride)s and organic diamines are disclosed, for example, in U.S. Pat. Nos. 3,972,902 and 4,455,410. Illustrative examples of aromatic bis(ether anhydride)s of formula (24) include: 2,2-bis[4-(3, 4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as mixtures comprising at least two of the foregoing.

Exemplary diamino compounds of formula (25) include ethylenediamine, propylenediamine, trimethylenediamine, diethylenetriamine, triethylenetetraamine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy) ethane, bis(3-aminopropyl)sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(b-amino-t-butyl)toluene, bis (p-b-amino-t-butylphenyl) ether, bis(p-b-methyl-o-aminophenyl)benzene, bis(p-b-methyl-o-aminopentyl) benzene, 1,3-diamino-4-isopropylbenzene, bis(4-aminophenyl)sulfide, bis(4-aminophenyl)sulfone, bis(4-aminophenyl)ether and 1,3-bis(3-aminopropyl) tetramethyldisiloxane. Mixtures comprising at least one of these compounds may also be present. The diamino compounds can, specifically, be aromatic diamines, especially m- and p-phenylenediamine and mixtures comprising at least one of these compounds.

In general, the reactions can be carried out employing various solvents, e.g., o-dichlorobenzene, m-cresol/toluene, and the like, to effect a reaction between the anhydride of formula (24) and the diamine of formula (25), at temperatures of about 100° C. to about 250° C. Alternatively, the polyetherimide can be prepared by melt polymerization or interfacial polymerization, e.g., melt polymerization of aromatic bis(ether anhydride)s (24) and diamines (25) and optionally (27) by heating a mixture of the starting materials to elevated temperatures with concurrent stirring. Generally, melt polymerizations employ temperatures of about 200° C. to about 400° C. Chain stoppers and branching agents may also be employed in the reaction. When polyetherimide/polyimide copolymers are employed, a dianhydride, such as pyromellitic anhydride, is used in combination with the bis(ether anhydride). Included among the many methods of making the polyimides, particularly polyetherimides, are those disclosed in U.S. Pat. Nos. 3,847,867, 3,850,885, 3,852,242, 3,855,178, 3,983,093, and 4,443,591.

Useful polyimides as described herein can have a melt index of about 0.1 to about 10 grams per minute (g/min), as measured by ASTM D1238-04 at 295° C., using a 6.6 kilogram (kg) weight. The polyetherimide resin can have a weight average molecular weight (Mw) of about 10,000 to about 150,000 grams per mole (g/mole), with a Mw of about 10,000 g/mole to about 75,000 g/mole preferred, about 10,000 g/mole to about 65,000 g/mole more preferred, and about 10,000 g/mole to about 55,000 g/mole even more preferred, as measured by gel permeation chromatography, using a polystyrene standard. Such polyetherimide resins typically have an intrinsic viscosity greater than about 0.2 deciliters per gram (dl/g), preferably about 0.35 to about 0.7 dl/g measured in m-cresol at 25° C. Exemplary polyetherimides include, but are not limited to, ULTEM® 1000 and 1000LC (number average molecular weight ($M_n$) 21,000 g/mol; $M_w$ 54,000 g/mol; dispersity 2.5), ULTEM® 1010 ($M_n$ 19,000 g/mole; $M_w$ 47,000 g/mol; dispersity 2.5), ULTEM® 1040 ($M_n$ 12,000 g/mol; $M_w$ 34,000 to 35,000 g/mol; dispersity 2.9) (all commercially available from General Electric Advanced Materials), or mixtures comprising at least one of the foregoing. Transparent, low color polyetherimides such as ULTEM® 1000LC (GE Plastics) are specifically useful.

Thermoplastic polymers of use herein also include polyolefins. Polyolefins include those of the general structure: $C_nH_{2n}$. Examples of polyolefins include polyethylene, polypropylene, polybutylene, polyisobutylene, and poly(ethylene-co-propylene). Specifically useful homopolymers include polyethylene, LLDPE (linear low density polyethylene), HDPE (high density polyethylene), MDPE (medium density polyethylene), and isotatic polypropylene.

Copolymers of polyolefins may also be used such as copolymers of ethylene and alpha olefins like propylene and 4-methylpentene-1 and copolymers of ethylene and rubber such as butyl rubber. Copolymers of ethylene and $C_3$-$C_{10}$ monoolefins and non-conjugated dienes, herein referred to as EPDM copolymers, may be used. Examples of $C_3$-$C_{10}$ monoolefins for EPDM copolymers include propylene, 1-butene, 2-butene, 1-pentene, 2-pentene, 1-hexene, 2-hexene, and 3-hexene. Useful dienes include 1,4-hexadiene and monocylic and polycyclic dienes. Mole ratios of ethylene to other $C_3$-$C_{10}$ monoolefin monomers may be from 95:5 to 5:95 with diene units being present in the amount of from 0.1 to 10 mol %. EPDM copolymers can also be functionalized with a hydroxyl group, acyl group, or electrophilic group for grafting.

The thermoplastic composition can comprise a poly(alkenyl aromatic) resin. The term "poly(alkenyl aromatic) resin" as used herein includes polymers prepared by methods known in the art including bulk, suspension, and emulsion polymerization, which contain at least 25% by weight of structural units derived from an alkenyl aromatic monomer of the formula (28):

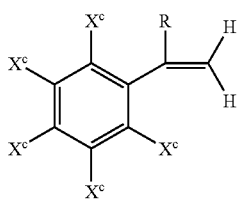

(28)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkylaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Exemplary alkenyl aromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like, and combinations comprising at least one of the foregoing compounds. Styrene and/or alpha-methylstyrene may be used as monomers copolymerizable with the conjugated diene monomer.

Preferred alkenyl aromatic monomers include styrene, chlorostyrene, and vinyltoluene. The poly(alkenyl aromatic) resins include homopolymers of an alkenyl aromatic monomer; random copolymers of an alkenyl aromatic monomer, such as styrene, with one or more different monomers such as acrylonitrile, butadiene, alpha-methylstyrene, ethylvinylbenzene, divinylbenzene, and maleic anhydride; and rubber-modified poly(alkenyl aromatic) resins comprising blends and/or grafts of a rubber modifier and a homopolymer of an alkenyl aromatic monomer (as described above), wherein the rubber modifier may be a polymerization product of at least one $C_4$-$C_{10}$ nonaromatic diene monomer, such as butadiene or isoprene, and wherein the rubber-modified poly(alkenyl aromatic) resin comprises 98 to 70 weight percent of the homopolymer of an alkenyl aromatic monomer and 2 to 30 weight percent of the rubber modifier, preferably 88 to 94 weight percent of the homopolymer of an alkenyl aromatic monomer and 6 to 12 weight percent of the rubber modifier.

The stereoregularity of the poly(alkenyl aromatic) resin may be atactic or syndiotactic. Highly preferred poly(alkenyl aromatic) resins include atactic and syndiotactic homopolystyrenes. Atactic homopolystyrenes are commercially available as, for example, EB3300 from Chevron, and P1800 from BASF. Syndiotactic homopolystyrenes are commercially available as, for example, from Dow Chemical Company and from Idemitsu Kosan Company, Ltd. Highly preferred poly (alkenyl aromatic) resins further include the rubber-modified polystyrenes, also known as high-impact polystyrenes or HIPS, comprising about 88 to about 94 weight percent polystyrene and about 6 to about 12 weight percent polybutadiene, with an effective gel content between 10 and 35%. These rubber-modified polystyrenes are commercially available as, for example, GEH 1897 from GE Plastics, and BA 5350 from Chevron.

The thermoplastic composition may comprise the poly (alkenyl aromatic) resin in an amount of 1 to 99.99 weight percent, based on the total weight of the thermoplastic polymer, the black dye, and the fluorescent dye.

The thermoplastic composition can also include poly(alkenyl aromatic) resin addition polymers and/or copolymers having both good impact properties and high transparency. These polymers comprise the addition polymer product of a vinyl aromatic monomer, additional vinyl monomers, and can further include elastomer-modified block or graft copolymers comprising an elastomeric (i.e., rubbery) block typically having a $T_g$ less than or equal to about 10° C. Such polymers are transparent where the refractive indices of the elastomer phase and more rigid matrix phase are adjusted by composition, size, and/or structure to provide a polymer with both good impact properties and high transparency. Polymers having the foregoing properties include styrene-acrylonitrile polymers (SAN), and modified acrylonitrile-butadiene-styrene (ABS) polymers, specifically "transparent ABS" materials that incorporate the impact modifying properties of ABS with high transparency.

Such elastomer-modified block or graft copolymers may be prepared by first providing the elastomeric polymer, then polymerizing the vinyl monomer(s) in the presence of the elastomer to obtain a more rigid phase having higher $T_g$ than the elastomer block of the copolymer. Conjugated diene monomers for preparing the elastomeric phase include those of formula (29):

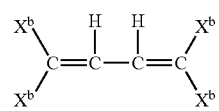

(29)

wherein each $X^b$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as combinations comprising at least one of the foregoing conjugated diene monomers. Specific conjugated diene homopolymers include polybutadiene and polyisoprene. Copolymers of a conjugated diene rubber may also be used. Useful copolymerizable monomers for copolymerization with the conjugated diene include alkenyl aromatic monomers, such as monomers of formula (28). Exemplary alkenyl aromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like, and combinations comprising at least one of the foregoing compounds.

The rigid phase, also referred to herein as the matrix phase, is prepared by addition polymerization of suitable vinyl monomers. Vinyl monomers include alkenyl aromatic monomers of formula (28), and non-aromatic vinyl monomers of the generic formula (30):

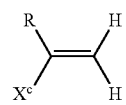

(30)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, or the like. Examples of monomers of formula (30) include acrylonitrile, methacrylonitrile, alpha-chloroacrylonitrile, beta-chloroacrylonitrile, alpha-bromoacrylonitrile, acrylic acid, methyl(meth)acrylate, ethyl (meth)acrylate, n-butyl(meth)acrylate, t-butyl (meth) acrylate, n-propyl(meth)acrylate, isopropyl(meth)acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Combinations of the foregoing monovinyl monomers and alkenyl aromatic monomers may also be used.

The elastomer phase may be polymerized by mass, emulsion, suspension, solution or combined processes such as bulk-suspension, emulsion-bulk, bulk-solution or other techniques, using continuous, semi-batch, or batch processes. The elastomer phase may be a conjugated butadiene or $C_{4-6}$ alkyl acrylate rubber or a combination of butadiene with styrene and/or $C_{4-6}$ alkyl acrylate rubbers.

The elastomeric phase comprises about 5 to about 95 wt %, more specifically about 20 to about 90 wt %, and even more specifically about 40 to about 85 wt % of the elastomer-modified copolymer, the remainder being the rigid graft phase.

The rigid phase of the elastomer-modified copolymer may be formed by polymerization of a combination comprising an alkenyl aromatic monomer and optionally at least one comonomer in the presence of at least one elastomeric polymer substrates. The above-described alkenyl aromatic monomers of formula (28) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing alkenyl aromatic monomers. Useful comonomers include, for example, the above-described vinyl monomers and/or monomers of the general formula (29). In one embodiment, R is hydrogen or $C_1$-$C_2$ alkyl, and $X^c$ is cyano or $C_1$-$C_{12}$ alkoxycarbonyl. Exemplary comonomers for use in the rigid phase include acrylonitrile, methacrylonitrile, methyl(meth)acrylate, ethyl (meth)acrylate, n-propyl (meth)acrylate, isopropyl(meth) acrylate, and the like, and combinations comprising at least one of the foregoing comonomers.

The relative ratio of alkenyl aromatic monomer and comonomer in the rigid graft phase may vary widely depending on the type of elastomer substrate, type of alkenyl aromatic monomer(s), type of comonomer(s), and the desired properties of the impact modifier. The rigid phase may generally comprise less than or equal to about 100 wt % of alkenyl aromatic monomer, specifically about 30 to about 100 wt %, more specifically about 50 to about 90 wt % alkenyl aromatic monomer, with the balance of the rigid phase being monomer(s) of formula (30).

An exemplary elastomer-modified copolymer that is useful as a transparent thermoplastic polymer includes but is not limited to methyl methacrylate-acrylonitrile-butadiene-styrene (MABS). Transparent ABS is available commercially for example under the tradename SHINKO-LAC® available from Diapolyacrylate Company. An exemplary non-elastomer-modified copolymer is styrene-acrylonitrile (SAN). The thermoplastic composition may comprise transparent ABS resin and/or SAN in an amount of 1 to 99.99 weight percent, based on the total weight of the thermoplastic polymer, the black dye, and the fluorescent dye.

The thermoplastic composition thus contains one or more of the foregoing thermoplastic polymers. It is understood that the thermoplastic polymers disclosed herein, and/or blends comprising these, may be used in the thermoplastic composition provided they do not substantially adversely affect the desired properties of the thermoplastic composition.

The thermoplastic polymer has a high infrared light transmission of greater than 50%, when measured using a molded article having a thickness of 2.0 millimeters (mm) and consisting of the thermoplastic polymer, according to ASTM D1003-00 at a wavelength of greater than 760 nm. In an embodiment, a molded article having a thickness of 2.0 mm, and consisting of the thermoplastic polymer has a percent transmission of infrared light, according to ASTM D1003-00 of greater than or equal to 50%, specifically greater than or equal to 60%, and still more specifically greater than or equal to 70% transmission, when measured at a wavelength of 800 to 1,100 nm, specifically 800 to 1,000 nm, and more specifically 800 to 950 nm. In a specific embodiment, a molded article having a thickness of 2.0 mm, and consisting of the thermoplastic polymer, has a percent transmission of infrared light, according to ASTM D1003-00 of greater than or equal to 80%, specifically greater than or equal to 85%, and still more specifically greater than or equal to 90% transmission, when measured at a wavelength of 800 to 1,100 nm, specifically 800 to 1,000 nm, and more specifically 800 to 950 nm.

The thermoplastic polymer desirably has a low haze of less than 5%, when measured using a molded article having a thickness of 2.0 mm and consisting of the thermoplastic polymer according to ASTM D1003-00 at a wavelength of 400 to 760 nm. In an embodiment, a molded article having a thickness of 2.0 mm, and consisting of the thermoplastic polymer, has a haze according to ASTM D1003-00 of less than or equal to 5%, specifically less than or equal to 4%, and still more specifically less than or equal to 3%.

The thermoplastic composition comprises a non-fluorescent dye as a colorant. Any non-fluorescent dye can be used, provided the dye does not significantly adversely affect the desired properties of the thermoplastic composition. In an embodiment, the non-fluorescent dye has a low absorbance in the infrared range above a wavelength of 760 nm, when present in a concentration that is effective to provide the desired color. Useful dyes desirably have a dark color when used in a concentration sufficient to provide the desired absorbance characteristics for the thermoplastic composition. In an embodiment, the non-fluorescent dye is desirably a black dye or combination of two or more dyes that provides black color. Useful dyes include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; and the like; and a combination comprising at least one of the foregoing non-fluorescent dyes. Oil-soluble dyes are specifically useful. Exemplary dyes include C.I. Solvent Yellow (6, 9, 17, 19, 21, 31, 35, 61, 80, 93, 100, 102, 103, 105); C.I. Disperse Yellow (3, 42, 54, 64, 79, 114, 119, 134, 198, 201, 211, 241); C.I. Solvent Orange (2, 7, 13, 14, 66); C.I. Disperse Orange (3, 11, 29, 30, 47, 118); C.I. Solvent Red (5, 16, 17, 18, 19, 22, 23, 52, 135, 143, 145, 146, 149, 150, 151, 157, 158, 176); C.I. Solvent Violet (19, 31, 32, 33, 36, 37); C.I. Solvent Blue (22, 63, 78, 83, 84, 85, 86, 91, 94, 95, 104); C.I. Solvent Green (3, 24, 25, 26, 28), and C.I.

Solvent Brown (3, 9). In addition to the above, other exemplary commercially available dyes include those marketed under the Aizen Sot® trade name and made by Hodogaya Chemical Co., Ltd., including Aizen Sot Yellow-1, 3, 4, Aizen Sot Orange-1, 2, 3, Aizen Sot Scarlet-1, Aizen Sot Red-1, 2, 3, Aizen Sot Brown-2, Aizen Sot Blue-1,2, Aizen Sot Violet-1, Aizen Sot Green-1, 2, 3, and Aizen Sot Black-1, 4, 6, 8; dyes marketed under the Sudan® trade name including Sudan Yellow-140, 150, Sudan Orange-220, Sudan Red-290, 380, 460, and Sudan Blue-670 (Trademark), made by BASF Corp.; dyes marketed under the Diaresin® trade name, including Diaresin Yellow-3G, F, H2G, HG, HC, HL, Diaresin Orange-HS, G, Diaresin Red-GG, S, HS, A, K, H5B, Diaresin Violet-D, Diaresin Blue-J, G, N, K, P, H3G, 4G, Diaresin Green-C, and Diaresin Brown-A, made by Mitsubishi Chemical Industries, Ltd.; dyes made under the Oil Color® trade name and including Oil Color Yellow-3G, GG-S, 105, Oil Color Orange-PS, PR, 201, Oil Color Scarlet-308, Oil Color Red-5B, Oil Color Brown-GR, 416, Oil Color Green-BG, 502, Oil Color Blue-BOS, HN, and Oil Color Black-HBB, 803, EE, EX, made by Orient Chemical Industries, Ltd.; dyes made under the Sumiplast® trade name and including Sumiplast Blue GP, OR, Sumiplast Red FB, 3B, and Sumiplast Yellow FL7G, GC, made by Sumitomo Chemical Co., Ltd.; and dyes made under the Kayaron® and Kayaset® tradenames including Kayaron Polyester Black EX-SH300, Kayaset Blue A-2R and Kayaset Red-B, made by Nippon Kayaku Co., Ltd.; dyes made under the Levafix® tradenames including Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, available from Bayer; dyes made under the Procion® tradename including Procion Turquoise PA, Procion Turquoise HA, Procion Turquoise H-5G, Procion Turquoise H-7G, Procion Red MX-5B, Procion Red MX 8B GNS, Procion Red G, Procion Yellow MC-8G, Procion Black H-EXL, Procion Black P-N, Procion Blue MX-R, Procion Blue MX-4GD, Procion Blue MX-G, and Procion Blue MX-2GN, available from ICI; Dyes under the Cibacron® and Lanasol® tradenames such as Cibacron Red F-B, Cibacron Black BG, Lanasol Black B, Lanasol Red 5B, Lanasol Red B, and Lanasol Yellow 4G, available from Ciba-Geigy; dyes made under the Basilen® tradename such as Basilen Black P-BR, Basilen Yellow EG, Basilen Brilliant Yellow P-3GN, Basilen Yellow M-6GD, Basilen Brilliant Red P-3B, Basilen Scarlet E-2G, Basilen Red E-B, Basilen Red E-7B, Basilen Scarlet E-2G, Basilen Red E-B, Basilen Red E-7B, Basilen Red-M5B, Basilen Blue E-R, Basilen Brilliant Blue P-3R, Basilen Black P-BR, Basilen Turquoise Blue P-GR, Basilen Turquoise M-2G, Basilen Turquoise E-G, and Basilen Green E-6B, available from BASF; dyes made under the Sumifix® tradename including Sumifix Turquoise Blue G, Sumifix Turquoise Blue H-GF, Sumifix Black B. Sumifix Black H-BG, Sumifix Yellow 2GC, Sumifix Supra Scarlet 2GF, and Sumifix Brilliant Red 5BF, available from Sumitomo Chemical Company; dyes made under the Intracron® tradename including Intracron Yellow C-8G, Intracron Red C-8B, Intracron Turquoise Blue GE, Intracron Turquoise HA, and Intracron Black RL, available from Crompton and Knowles, Dyes and Chemicals Division; dyes made under the Duasyn® tradename including Duasyn Black RL-SF, Duasyn Brilliant Yellow GL-SF, Duasyn Brilliant Red F3B-SF, and Duasyn Red 3B-SF, available from Hoechst; Reactive Yellow 86, available from Sigma Chemical Company, Reactive Black 5, Reactive Blue 4, Reactive Blue 15, Reactive Orange 16, Reactive Red 4, and Reactive Yellow 2, available from Aldrich Chemical Company Incorporated, and the like. A combination comprising at least one of the foregoing dyes may be used.

Additional exemplary dyes include the FLEXO®, Auramine®, Chrysoidine®, Victoria®, Crystal®, and Spirit® dyes available from BASF Corp. distributor in Clifton, N.J., which include diarylmethane dyes such as Yellow 105 Low-Dusting (also known as Basic Yellow 2203), Yellow 110 (Auramine FA), Yellow 110 Low-Dusting (Auramine FA-NS); Yellow 112 (Auramine FWA), and Yellow 112 Low-Dusting (Auramine FWA-NS); azomethine dyes such as Yellow 11B Low-Dusting; monoazo dyes such as Orange 204 (Chrysoidine FL); triarylmethane dyes including Violet 600 (Methyl Violet FN), Violet 615 (Crystal Violet FN), Blue 630 (Victoria blue FBR), Blue 838 (Victoria Pure Blue FBO), Blue 640 (Victoria Blue F8), Blue 640 Low-Dusting (Victoria Blue FB-NS), Blue 680 (Victoria Pure Blue FGA), and Blue 810 (Victoria Cyan FBG); and mixed dyes such as Green 990 (Spirit Green IY Conc.), Black XII (Flexo Black GL) and Blue 680 (Victoria Pure Blue FGA) also known as Basic Blue 81 C.I.

In an embodiment, a black dye comprises a dye or combination of dyes that provide a black color. In an embodiment, a single black dye can be used in a coloring amount. In another embodiment, a combination of two or more dyes can be used to provide a black color that can be used in the thermoplastic composition in a coloring amount. Two or more dyes that are complementary to each other are desirably used. As used herein, complementary dyes are dyes that have complementary absorbances such that the combination of complementary dyes absorbs light over a greater range of wavelengths than any one of the dyes would when used alone. In an exemplary embodiment, a combination of dyes which, when blended together and dispersed in a thermoplastic polymer provide a black color, include is a violet dye such as C.I. Solvent Violet 19 and/or C.I. Solvent Violet 36, in combination with a yellow dye, such as C.I. Solvent Yellow 93 and/or C.I. Disperse Yellow 201. In another exemplary embodiment, a combination of dyes which provide a black color include a red dye such as C.I. Solvent Red 52 and/or C.I. Solvent Red 176, in combination with C.I. Solvent Green 26 and/or C.I. Solvent Green 28. An exemplary commercial blended black dye is Keyplast® Black AN, available from Keystone Aniline. In a specific exemplary embodiment, a combination of dyes providing a black color comprises C.I. Solvent Green 3, available as Macrolex® Green 5B, and C.I. Solvent Red 135, available as Macrolex® Red EG, both available from Lanxess. In an embodiment, where two dyes are used to provide a black dye, the dyes are used in a weight ratio of 1:99 to 99:1. In some embodiments wherein extremely high light transmission (i.e., greater than 80% T) in the near IR is not necessary, the black dye can comprise pigments which are soluble in or highly dispersible with the thermoplastic polymer and which exhibit minimal light scattering specifically in the near IR region. Examples of such pigments, which are perylene-based pigments having a mean particle size of approximately 500 nanometers or less can include Lumogen® Black FK 4280 and FK 4281, available from BASF. In another embodiment, where the black dye comprises a blend of more than two dyes, the dyes are used in a weight ratio sufficient to provide a useful black color, where the black color is used in an amount sufficient to impart a useful color to the thermoplastic composition. Desirably, the black dye provides high transmittance in the infrared region of the spectrum from 800 to 1,100 nanometers. In a specific embodiment, the black dye, when used in combination with a thermoplastic polymer and when present in an amount sufficient to impart a useful color to the thermoplastic composition disclosed herein, has a percent transmittance according to ASTM D1003-00 of greater than or equal to 50%, specifically greater than or equal to 60%, more specifically greater than or equal to 70%, and still more specifically greater than or equal to 80% of incident light, when measured at a wavelength of from 800 to 1,100 nm, specifically 800 to 1,000 nm, and more specifically 800 to 950 nm.

The black dye is used in a coloring amount of 0.01 to 25 wt %, specifically 0.02 to 20 wt %, and more specifically 0.05 to 15 wt %, based on the total weight of thermoplastic polymer, black dye, and fluorescent dye.

The thermoplastic composition includes a fluorescent dye. As used herein, the term "fluorescent" refers to the emission of visible light after absorbing daylight radiation. Also as used herein, the term "fluorescent dye" is a dyestuff that exhibits the phenomenon of fluorescence in the visible region of the spectrum. Any fluorescent dye can be used, provided the dye does not significantly adversely affect the desired properties of the thermoplastic composition. In an embodiment, the fluorescent dye has a low absorbance in the infrared range above a wavelength of 760 nm, when present in a concentration that is effective to provide the desired color. Exemplary dyes include the daylight fluorescent-type dyes that belong to the dye families known as rhodamines, fluoresceins, coumarins, naphthalimides, benzoxanthenes, perylenes, pyrenes, acridines, or a combination comprising at least one of the foregoing. Examples include luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like; perylene dyes such as those based on imido derivatives of perylene tetracarboxylic acid; or combinations comprising at least one of the foregoing dyes. Suppliers of fluorescent colorants include Radiant Color Company (Richmond, Calif.), Day-Glo Color Corp. (Cleveland, Ohio), Sun Chemical Co. (Cincinnati, Ohio). Sinloihi Co. Ltd. (Tokyo, Japan), Swada (London, England), Mikuni Color Works Ltd. (Himeji, Japan), Matsui International Co, Inc (Japan), Nippon Keiko Color Company (Japan). Specifically useful fluorescent dyes include those available under the following tradenames: Diaresin® dyes from Mitsubishi Chemical (Japan); Lumogen® dyes from BASF (Germany), Irgalite® and Maxilon® dyes from Ciba Specialty Chemicals (Germany), Macrolex® dyes from Lanxess (Germany), and Hostasol® dyes from Clariant. Typical commercially available fluorescent dyes of the above types include amino phthalate dyes such as Rhodamine BDC (C.I. 45,170), Rhodamine 6GDN extra (C.I. 45,160; Red 480), Rhodamine F5G (Red 482), Rhodamine FB (Red 540), and Rhodamine F3B (C.I. 45,175); naphthalimide derivatives such as Lumogen® F Blue 650; perylene derivatives such as Lumogen® F Red 305; Lumogen® F Yellow 083; Lumogen® F Violet 570; Lumogen® F Green 850; Macrolex® Fluorescent Yellow 10GN (C.I. Solvent Yellow 160:1); Macrolex® Red G; Irgalite® Violet M, Maxilon® Brilliant Flavine 10GFF, Maxilon® Black FBL-01, Maxilon® Black RM-01, Maxilon® Blue 5G, Maxilon® Blue 5G-01, Maxilon® Blue GRL/Pearl, Maxilon® Blue GRL Granulated, Maxilon® Blue GRL E, Maxilon® Blue M-G, Maxilon® Blue TRL Liquid, Maxilon® Golden Yellow GL Pearls, Maxilon® Navy FRL-02, Maxilon® Red GRL-01 Pearl, Maxilon® Red GRL-E, Maxilon® Red GRL Pearls, Maxilon® Red M-4GL, Maxilon® Yellow M-3RL, and Maxilon® Yellow M-4GL; Hostasol® Red 5B (Vat Red 41), Hostasol® Red GG (Solvent Orange 63), and Hostasol® Yellow 3G (Solvent Yellow 98); Fluorescent yellow F6PN and Yellow Y toner; Fluorescent Red 66; fluorescein; and 9-aminoacridine. A combination comprising at least one of the foregoing fluorescent dyes may be used. In an exemplary embodiment, fluorescent dyes useful herein include Lumogen® F Blue 650, Lumogen® Red 305, and Macrolex® Fluorescent Yellow 10GN. It will be understood that numerous fluorescent dyes are available commercially and are useful herein, and that therefore the foregoing list of fluorescent dyes should be considered exemplary, and not limiting to the dyes disclosed hereinabove.

In an embodiment, the fluorescent dyes may be covalently bonded to a polymeric backbone to provide a polymer-supported fluorescent dye, and may also be referred to as dye conjugates. Such dye conjugates are useful to provide a fluorescent dye that is predispersed, i.e., one that is distributed throughout the polymer and which can provide a maximum fluorescence due to the more uniform dispersion. Dyes which are not so dispersed may aggregate or clump, and thereby decrease the effective loading of the dye based on the desired linear relationship between the fluorescent intensity and dye loading. Further, aromatic dyes, such as for example pyrene-based dyes, can when held proximate to one another form dimeric complexes ("excimers") that can have a shifted absorbance and/or fluorescent emission wavelength and intensity relative to the parent non-dimeric dye. Distributing the fluorescent dye along a polymer backbone by covalent bonding can, in addition to the advantages enumerated hereinabove, be used as a method to reduce or eliminate excimer formation. Fluorescent dyes that are useful for preparing dye conjugates include those having reactive functional groups capable of forming a covalent bond with a useful monomer or functional polymer or functional resin. Exemplary reactive groups provided by the fluorescent dye include phenolic hydroxy, aliphatic hydroxy, aromatic amine, aliphatic amine, thiols, carboxylic acid, and carboxylate esters. It will be understood that the foregoing list of reactive groups is meant to be exemplary, and should not be limited thereto. Further functionalization of these functional fluorescent dyes, to provide reactive derivatives, can further increase the reactive usefulness of the fluorescent dye so functionalized. Reactive substituents can be formed by covalently reacting functional agents such as, for example, reactive derivatives of (meth) acrylic acid such as (meth)acryloyl chloride; carbonyl dihalides such as phosgene; thiocarbonyl dihalides such as thiophosgene; maleic anhydride; chloroformates including alkyl, aryl, or aralkyl chloroformates, epichlorohydrin; or the like; to the above functional dyes to provide suitable reactive groups. In an exemplary embodiment, useful functionalized fluorescent dyes include functional groups such as (meth) acrylates, (meth)acrylamides, N-hydroxysuccinimidyl (NHS)esters, isocyanates, isothiocyanates, maleimides, chloroformates, anhydrides, mixed anhydrides, epoxides, and the like. Polymeric backbone supports for such dyes can include linear polymers, crosslinked polymers, dendrimers, graft copolymers, block copolymers including two or more blocks, end group modified polymers, hyperbranched copolymers, telechelic oligomers, or the like. Useful backbone polymers typically includes poly(meth)acrylic homopolymers or copolymers including poly(meth)acrylates, poly(meth)acrylamides, and the like; poly(vinyl aromatic) polymers and copolymers, including polystyrenes, copolymers thereof, and the like; polyvinyl polymers such as poly(vinyl acetate) or poly(vinyl alcohol), copolymers thereof, and the like; poly(alkylene oxide)s, copolymers thereof, and the like. In an embodiment, the functionalized fluorescent dye is attached to a polymer by reaction of the functional dye with a complementarily functionalized polymer. In another embodiment, the functionalized fluorescent dye having a polymerizable end group such as a (meth)acrylate or epoxide can be copolymerized with other monomers or reactive oligomers to provide a polymer-supported fluorescent dye. Other polymeric backbones that may be used as backbone support include polyesters, polycarbonates, polyimides, carbohydrate materials including substituted or unsubstituted cellulosic materials, polysaccharides, dextrins, aminosugars, and the like; proteins; or a combination comprising at least one of the foregoing polymers. In an embodiment, the polymer-supported fluorescent dyes include fluorescent dyes incorporated into the polymeric backbone in an amount of 0.5 to 50 wt %, specifically 1 to 45 wt %, and more specifically 5 to 40 wt %, based on the total weight of the fluorescent dye and polymer backbone.

The fluorescent dye also provides high transmittance in the infrared region of the spectrum from 800 to 1,100 nanometers. In a specific embodiment, the fluorescent dye, when used in combination with a thermoplastic polymer and when present in an amount sufficient to impart a useful color to the thermoplastic composition disclosed herein, has a percent transmittance according to ASTM D1003-00 of greater than or equal to 50%, specifically greater than or equal to 60%, more specifically greater than or equal to 70%, and still more specifically greater than or equal to 80% of incident light, when measured at a wavelength of from 800 to 1,100 nm, specifically 800 to 1,000 nm, and more specifically 800 to 950 nm. Fluorescent dyes, including polymer-supported fluorescent dyes, are used in coloring amounts of 0.01 to 25 wt %, specifically 0.02 to 20 wt %, and more specifically 0.05 to 15 wt %, based on the total weight of thermoplastic polymer, black dye, and fluorescent dye.

A fluorescent brightener can also be included with the fluorescent dye. Fluorescent brighteners include fluorescent compounds which, when combined with a dye having relatively low fluorescence, act to increase the intensity of the fluorescent emissions from the dye combination. In an embodiment, a fluorescent brightener is used in combination with a blue fluorescent dye. Exemplary fluorescent brighteners include those marketed under the tradename Uvitex® and available from Ciba Specialty Chemicals, or DIPHYL® and BLANKOPHOR® available from Lanxess. In a specific exemplary embodiment, a useful combination of a blue dye and fluorescent brightener includes Uvitex® OB, available from Ciba Specialty Chemicals, as fluorescent brightener. It will be understood that the foregoing fluorescent brightener is exemplary and should not be considered as limiting thereto. Where used, a fluorescent brightener may be included in an amount of 0.005 to 25 wt %, specifically 0.01 to 20 wt %, and more specifically 0.015 to 15 wt %, based on the total weight of thermoplastic polymer, black dye, and fluorescent dye.

Typically, non-fluorescent dyes have been used to prepare infrared transmissive thermoplastic compositions. Articles prepared using such thermoplastic compositions have a high infrared light transmission (% T) measured as a percentage of incident light transmitted through an article prepared using the thermoplastic composition, for infrared light of a wavelength of greater than or equal to 760 nanometers (nm), a region of the spectrum referred to generally as the "near infrared", and abbreviated as both "near-IR" and also "NIR". Infrared light emitting sources, such as for example GaAsP semiconductor lasers, can emit at discrete wavelengths, wherein high transmissivity at the emission wavelength is needed for maintaining signal intensity for optimal data signal transfer or sensing purposes. Operating wavelengths of interest in the infrared may include, for example, 835 nm and 905 mm, though other wavelengths can be used. Desirably, articles prepared from infrared transmissive thermoplastic compositions, such as, for example, windows for infrared-transmitting devices, have high absorbance in the visible region, as measured from 400 to 750 nm. This absorbance is useful for minimizing stray light in the interior of the device. In addition, the high absorbance in the visible region provides a desirable aesthetic effect wherein the interior of the device is not visible to the unaided, naked eye. However, use of quantities of such non-fluorescent dyes that is sufficient to provide the desired absorbance across this range of wavelengths also imparts a dark or black color to the article. Such dark color is undesirable for applications where the window color is desirably a bright color, e.g., a bright red, yellow, green, blue, or intermediate color. Addition of further dyes or pigments to the dark colored thermoplastics typically only further darkens the thermoplastic composition, or may provide a darkened shade of the colorant. Multilayer thermoplastic compositions having an underlayer that has high visible light absorbance, overlaid with a layer having the desired finish color, may be used to provide the desired visual effect. However, articles having this construction are more complicated to produce and are more limited in application, where it is significantly more difficult in time, manufacturability, and robustness of construction to produce small molded multi-layer articles, or molded articles with non-uniform topographic features. Such articles produced in this way, in addition to proving costly to produce, can have poor uniformity and undesirable optical properties.

Surprisingly, it has been found that a thermoplastic composition comprising a combination of an infrared transmissive thermoplastic polymer, an infrared transmissive non-fluorescent dye or dye package having a black color, and a fluorescent dye, provides a colored thermoplastic that is transmissive in the infrared at wavelengths greater than 760 nm, absorbing in the visible range from 400 to 750 nm, and has an aesthetically desirable colored appearance. The infrared transmissive thermoplastic polymer has a high infrared light transmission (% T) measured as a percentage of incident light transmitted through an article prepared using the thermoplastic composition, for infrared light of a wavelength of greater than or equal to 760 nanometers (nm), a region of the spectrum referred to generally as both the "near infrared" and "near-IR". In addition, the fluorescent and non-fluorescent dyes also have a high infrared light transmission at a wavelength of greater than 760 nm. The thermoplastic composition also desirably provides a molded article with a surface reflectance that can provide for a glossy appearance or muted gloss appearance. In addition, the color visible in the molded articles comprising the thermoplastic composition has high color brightness to the naked, unaided eye, and a high aesthetic appeal, in contrast to the dark or black color of a similar molded article prepared with a black dye and other optional dyes, but without a fluorescent dye.

While it is not required to provide an explanation of how an invention works, such theories may be useful to for the purposes of better helping the reader to comprehend the invention. Thus, it is to be understood that the claims are not to be limited by the following theory of operation. It is believed that the use of high clarity/high infrared transmissive thermoplastic polymers in combination with low-infrared absorbing non-fluorescent dyes and low infrared absorbing fluorescent dyes provides the desired absorbance, while the presence of fluorescent dye provides a bright color. The fluorescent dye, present at the surface of the article, provides a visible fluorescent emission upon excitation of the fluorescent dye using natural light or artificial light (incandescent and/or fluorescent) at the surface of the article. The emission thereby takes place at the surface of the article prepared from the thermoplastic composition, and does not require the color balance required using transmission (i.e., non-fluorescent) dyes.

In addition, in some embodiments, specifically wherein a high transmissivity in the infrared is necessary, such as for sensors and data transmission by infrared radiation, the use of pigments instead of dyes does not provide sufficient transmission in the infrared range because the pigments scatter infrared light. Pigments scatter visible lights as well, which results in diminishing the depth of color available at the surface of the article. Therefore, use of pigments does not provide the desired near infrared light transmission and depth of color, even where fluorescence occurs at the surface of the article. Furthermore, for such applications, the use of thermoplastic polymers with high transmissivity in both the infrared and in the visible wavelengths is desired to avoid issues related to light scattering or loss. For applications in which a higher level of light scattering is tolerable, the use of polymeric fluorescent and/or non-fluorescent dyes, dye-impregnated latex particles, where the refractive index of the backbone material is not significantly different from the refractive index of the surrounding matrix polymer, or either soluble pigments or highly dispersible pigments having a small particle size and minimal light scattering, can provide the dye or colorant in a particulate form which does not significantly adversely affect the desired properties of the thermoplastic composition and articles prepared therefrom.

The thermoplastic composition desirably has a high light transmission of greater than 50%, when measured according to ASTM D1003-00 at a wavelength of greater than 760 nm. In an embodiment, a molded article having a thickness of 2.0 mm, and consisting of the thermoplastic polymer, the black dye, and the fluorescent dye, has a percent transmission of infrared light, according to ASTM D1003-00 of greater than or equal to 50%, specifically greater than or equal to 60%, and still more specifically greater than or equal to 70% transmission, when measured at a wavelength of 800 to 1,100 nm, specifically 800 to 1,000 nm, and more specifically 800 to 950 nm. In a specific embodiment, a molded article having a thickness of 2.0 mm, and consisting of the thermoplastic polymer, the black dye, and the fluorescent dye, has a percent transmission of infrared light, according to ASTM D1003-00 of greater than or equal to 80%, specifically greater than or equal to 85%, and still more specifically greater than or equal to 90% transmission, when measured at a wavelength of 800 to 1,100 nm, specifically 800 to 1,000 nm, and more specifically 800 to 950 nm.

The thermoplastic composition desirably has a low visible light transmission of less than 20%, when measured according to ASTM D1003-00 at a wavelength of 400 to 760 nm. In an embodiment, a molded article having a thickness of 2.0 mm, and consisting of the thermoplastic polymer, the black dye, and the fluorescent dye, has a percent transmission of infrared light, according to ASTM D1003-00 of less than or equal to 15%, specifically less than or equal to 12%, and still more specifically less than or equal to 10% transmission, when measured at a wavelength of 400 to 750 nm, specifically 400 to 700 nm, and more specifically 400 to 650 nm.

The thermoplastic composition desirably has a low haze of less than 5%, when measured according to ASTM D1003-00. In an embodiment, a molded article having a thickness of 2.0 mm, and consisting of the thermoplastic polymer, the black dye, and the fluorescent dye, has a haze according to ASTM D1003-00 of less than or equal to 5%, specifically less than or equal to 4%, and still more specifically less than or equal to 3%, when measured at a wavelength of 400 to 750 nm, specifically 400 to 700 nm, and more specifically 400 to 650 nm.

In addition, the thermoplastic composition has a surface reflectivity when molded of greater than or equal to 7% according to ASTM E1331-04. Thus, in an embodiment, a molded article consisting of the thermoplastic polymer, black dye, and fluorescent dye has a percent surface reflectivity according to ASTM E1331-04 of greater than or equal to 7%, specifically greater than or equal to 10%, and more specifically greater than or equal to 12%/o, when measured at a wavelength of 400 to 750 nm, specifically 400 to 700 nm, and more specifically 400 to 650 nm.

In addition to the thermoplastic polymers, black dye, and fluorescent dye described hereinabove, the thermoplastic composition may further include various other additives ordinarily incorporated with thermoplastic compositions of this type, with the proviso that the additives are selected so as not to adversely affect the desired properties of the thermoplastic composition. Mixtures of additives may be used. Such additives may be mixed at a suitable time during the mixing of the components for forming the thermoplastic composition.

The thermoplastic composition may include fillers or reinforcing agents with the proviso that the additives are selected so as not to adversely affect the desired properties of the thermoplastic composition.

Specifically, useful fillers as contemplated herein are visual effects fillers that possess compositional, shape and dimensional qualities useful to the reflection and/or refraction of light. Visual effect fillers include those having planar facets and can be multifaceted or in the form of flakes, shards, plates, leaves, wafers, and the like. The shape can be irregular or regular. A non-limiting example of a regular shape is a hexagonal plate. Visual effect fillers are two dimensional, plate-type fillers, wherein a particle of a plate type filler has a ratio of its largest dimension to smallest dimension of greater than or equal to 3:1, specifically greater than or equal to 5:1, and more specifically greater than or equal to 10:1. The largest dimension so defined can also be referred to as the diameter of the particle. Plate-type fillers have a distribution of particle diameters described by a minimum and a maximum particle diameter. The minimum particle diameter is described by the lower detection limit of the method used to determine particle diameter, and corresponds to it. A typical method of determining particle diameters is laser light scattering, which can for example have a lower detection limit for particle diameter of 0.6 nanometers. It should be noted that particles having a diameter less than the lower detection limit may be present but not observable by the method. The maximum particle diameter is typically less than the upper detection limit of the method. The maximum particle diameter herein may be less than or equal to 1,000 micrometers, specifically less than or equal to 500 micrometers. The distribution of particle diameters can be unimodal, bimodal, or multimodal. The diameter can be described more generally using the mean of the distribution of the particle diameters, also referred to as the mean diameter. Useful particles may have a mean diameter of 1 to 100 micrometers, specifically 5 to 75 micrometers, and more specifically 10 to 60 micrometers. The particles may also be in the form of nanoparticles, i.e., particles with a median particle size ($D_{50}$) smaller than 100 nm as determined using light scattering methods. Specific reflective fillers are further of a composition having an optically dense surface exterior finish useful for reflecting incident light. Metallic and non-metallic fillers such as those based on aluminum, silver, copper, bronze, steel, brass, gold, tin, silicon, alloys of these, combinations comprising at least one of the foregoing metals, and the like, are specifically useful. Also specifically useful are inorganic fillers prepared from a composition presenting a surface that is useful for reflecting and/or refracting incident light. In contrast to a reflective filler, a refractive filler having refractive properties can be at least partially transparent, i.e., can allow transmission of a percentage of incident light, and can provide optical properties based on reflection, refraction, or a combination of reflection and refraction of incident light. Inorganic fillers having light reflecting and/or refracting properties useful herein may include micas, alumina, silica, silicon carbide, glass, combinations comprising at least one of the foregoing inorganic fillers, and the like.

The fillers may be coated with a layer of metallic material to facilitate conductivity where desired, or surface treated with silanes to improve adhesion, dispersion, and/or optical properties with the polymeric matrix resin. Where used, fillers can be present in amounts of 0 to 90 percent by weight, based on the total weight of thermoplastic polymer, black dye, and fluorescent dye.

The thermoplastic composition can include an antioxidant. Useful antioxidant additives include, for example, organophosphites such as tris(nonylphenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants can be used in amounts of 0.0001 to 1 percent by weight, based on the total weight of thermoplastic polymer, black dye, and fluorescent dye.

Useful heat stabilizer additives include, for example, organophosphites such as triphenyl phosphite, tris-(2,6-dimethylphenyl)phosphite, tris-(mixed mono- and di-nonylphenyl) phosphite or the like; phosphonates such as dimethylbenzene phosphonate or the like, phosphates such as trimethyl phosphate, or the like, or combinations comprising at least one of the foregoing heat stabilizers. Heat stabilizers can be used in amounts of 0.0001 to 1 percent by weight, based on the total weight of thermoplastic polymer, black dye, and fluorescent dye.

Light stabilizers and/or ultraviolet light (UV) absorbing additives may also be used. Useful light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers can be used in amounts of 0.0001 to 1 percent by weight, based on the total weight of thermoplastic polymer, black dye, and fluorescent dye.

Useful UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl) oxy]-2,2-bis[[(2-cyano-3,3-diphenylacryloyl)oxy]methyl] propane (UVINUL® 3030); 2,2'-(1,4-phenylene)bis(4H-3,1-benzoxazin-4-one); 1,3-bis[(2-cyano-3,3-diphenylacryloyl) oxy]-2,2-bis[[(2-cyano-3,3-diphenylacryloyl)oxy]methyl] propane; nano-size inorganic materials such as titanium oxide, cerium oxide, and zinc oxide, all with particle size less than 100 nanometers; or the like, or combinations comprising at least one of the foregoing UV absorbers. UV absorbers can be used in amounts of 0.0001 to 1 percent by weight, based on the total weight of thermoplastic polymer, black dye, and fluorescent dye.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials can be used in amounts of 0.001 to 1 percent by weight, based on the total weight of thermoplastic polymer, black dye, and fluorescent dye.

The thermoplastic composition can include antistatic agents. The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example Pelestat® 6321 (Sanyo) or Pebax® MH1657 (Atofina), Irgastat® P18 and P22 (Ciba-Geigy). Other polymeric materials that may be used as antistatic agents are inherently conducting polymers such as polyaniline (commercially available as PANIPOL® EB from Panipol), polypyrrole, and polythiophenes such as for example poly(3,4-ethylenedioxythiophene) (commercially available from H. C. Stark), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents can be used in amounts of 0.0001 to 5 percent by weight, based on the total weight of thermoplastic polymer, black dye, and fluorescent dye.

The thermoplastic composition can include flame retardants. Flame retardant that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkylaryl, or arylalkyl group, provided that at least one G is an aromatic group. Two of the G groups may be joined together to provide a cyclic group, for example, diphenyl pentaerythritol diphosphate. Other useful aromatic phosphates may be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis (2-ethylhexyl) p-tolyl phosphate, tritolyl phosphate, bis(2-ethylhexyl)phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

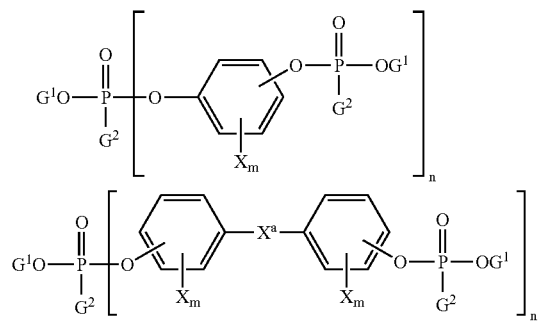

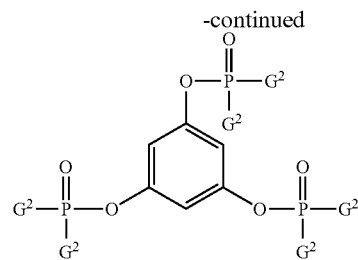

wherein each $G^1$ is independently a hydrocarbon having 1 to 30 carbon atoms; each $G^2$ is independently a hydrocarbon or hydrocarbonoxy having 1 to 30 carbon atoms; each $X^a$ is independently a hydrocarbon having 1 to 30 carbon atoms; each X is independently a bromine or chlorine; m is 0 to 4, and n is 1 to 30. Examples of useful di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, their oligomeric and polymeric counterparts, and the like.

Exemplary flame retardant compounds containing phosphorus-nitrogen bonds include phosphonitrilic chloride, phosphorus ester amides, phosphoric acid amides, phosphonic acid amides, phosphinic acid amides, tris(aziridinyl) phosphine oxide. When present, phosphorus-containing flame retardants can be present in amounts of 0.1 to 10 percent by weight, based on the total weight of thermoplastic polymer, black dye, and fluorescent dye.

Halogenated materials may also be used as flame retardants, for example halogenated compounds and resins of formula (31):

(31)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (31) are each independently mono- or polycarbocyclic aromatic groups such as phenylene, biphenylene, terphenylene, naphthylene, or the like. Also in formula (31), Y is an organic, inorganic, or organometallic radical, for example: halogen, e.g., chlorine, bromine, iodine, fluorine; ether groups of the general formula OE, wherein E is a monovalent hydrocarbon radical similar to X; monovalent hydrocarbon groups of the type represented by R; or other substituents, e.g., nitro, cyano, and the like, said substituents being essentially inert provided that there is at least one and preferably two halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and arylalkyl group such as benzyl, ethylphenyl, or the like; a cycloaliphatic group such as cyclopentyl, cyclohexyl, or the like. The monovalent hydrocarbon group may itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar', can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen containing flame retardants can be present in amounts of 0.1 to 10 percent by weight, based on the total weight of thermoplastic polymer, black dye, and fluorescent dye.

The thermoplastic composition can include an anti-drip agent. Anti-drip agents may be, for example, a fibril forming or non-fibril forming fluoropolymer such as polytetrafluoroethylene (PTFE). The anti-drip agent may be encapsulated by a rigid copolymer as described above, for example styrene-acrylonitrile copolymer (SAN). PTFE encapsulated in SAN is known as TSAN. Encapsulated fluoropolymers may be made by polymerizing the encapsulating polymer in the presence of the fluoropolymer, for example an aqueous dispersion. TSAN may provide significant advantages over PTFE, in that TSAN may be more readily dispersed in the composition. A useful TSAN may comprise, for example, 50 wt % PTFE and 50 wt % SAN, based on the total weight of the encapsulated fluoropolymer. The SAN may comprise, for example, 75 wt % styrene and 25 wt % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. Antidrip agents can be used in amounts of 0.1 to 5 percent by weight, based on the total weight of thermoplastic polymer, black dye, and fluorescent dye.

The thermoplastic composition may further comprise an ionizing radiation stabilizing additive. Exemplary ionizing radiation stabilizing additives include certain aliphatic alcohols, aromatic alcohols, aliphatic diols, aliphatic ethers, esters, diketones, alkenes, thiols, thioethers and cyclic thioethers, sulfones, dihydroaromatics, diethers, nitrogen compounds, or a combination comprising at least one of the foregoing. Alcohol-based stabilizing additives may be selected from mono, di-, or polysubstituted alcohols, and can be straight, branched, cyclic and/or aromatic. Useful aliphatic alcohols may include alkenols with sites of unsaturation, examples of which include 4-methyl-4-penten-2-ol, 3-methyl-pentene-3-ol, 2-methyl-4-penten-2-ol, 2,4-dimethyl-4-penten-2-ol, 2-phenyl-4-penten-2-ol, and 9-decen-1-ol; tertiary alcohols including 3-hydroxy-3-methyl-2-butanone, 2-phenyl-2-butanol, and the like; hydroxy-substituted tertiary cycloaliphatics such as 1-hydroxy-1-methyl-cyclohexane; and hydroxymethyl aromatics having an aromatic ring with carbinol substituents such as a methylol group (—CH$_2$OH) or a more complex hydrocarbon group such as (—CRHOH) or (—CR$_2$OH), wherein R is straight chain C$_1$-C$_{20}$ alkyl or branched C$_1$-C$_{20}$ alkyl. Exemplary hydroxy carbinol aromatics include benzhydrol, 2-phenyl-2-butanol, 1,3-benzenedimethanol, benzyl alcohol, 4-benzyloxy-benzyl alcohol, and 4-benzyl-benzyl alcohol.

Useful classes of ionizing radiation stabilizing additives are di- and polyfunctional aliphatic alcohols, also referred to as aliphatic diols and aliphatic polyols. Specifically useful are aliphatic diols of formula (32):

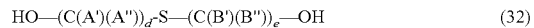

$$HO\text{---}(C(A')(A''))_d\text{---}S\text{---}(C(B')(B''))_e\text{---}OH \quad (32)$$

wherein A', A", B', and B" are each independently H or C$_1$-C$_6$ alkyl; S is C$_1$-C$_{20}$ alkyl, C$_2$-C$_{20}$ alkyleneoxy, C$_3$-C$_6$ cycloalkyl, or C$_3$-C$_6$ substituted cycloalkyl; and d and e are each 0 or 1, with the proviso that, when d and e are each 0, S is selected such that both —OH groups are not connected directly to a single common carbon atom.

In formula (32), A', A", B', and B" can each be independently selected from H, methyl, ethyl, n-propyl, isopropyl, n-butyl, sec-butyl, t-butyl, n-pentyl, 2-pentyl, 3-pentyl, isopentyl, neopentyl, n-hexyl, 2-hexyl, 3-hexyl, 2-methyl pentyl, 3-methylpentyl, 2,2-dimethylbutyl, 2,3-dimethylbutyl, and the like, and a combination comprising at least one of the foregoing alkyl groups.

Spacer group S can be selected from methanediyl, ethanediyl, 1,1-ethanediyl, 1,1-propanediyl, 1,2-propanediyl, 1,3-propanediyl, 2,2-propanediyl, 1,1-butanediyl, 1,2-butanediyl, 1,3-butanediyl, 1,4-butanediyl, 2,2-butanediyl, 2,3-butanediyl, 1,1-pentanediyl, 1,2-pentanediyl, 1,3-pentanediyl, 1,4-pentanediyl, 1,5-pentanediyl, 2,2-pentanediyl, 2,3-pentanediyl, 2,4-pentanediyl, 3,3-pentanediyl, 2-methyl-1,1-butanediyl, 3-methyl-1,1-butanediyl, 2-methyl-1,2-butanediyl, 2-methyl-1,3-butanediyl, 2-methyl-1,4-butanediyl, 2-methyl-2,2-butanediyl, 2-methyl-2,3-butanediyl, 2,2-dimethyl-1,1-propanediyl, 2,2-dimethyl-1,2-propanediyl, 2,2-dimethyl-1,3-propanediyl, 3,3-dimethyl-1,1-propanediyl, 3,3-dimethyl-1,2-propanediyl, 3,3-dimethyl-2,2-propanediyl, 1,1-dimethyl-2,3-propanediyl, 3,3-dimethyl-2,2-propanediyl, 1,1-hexanediyl, 1,2-hexanediyl, 1,3-hexanediyl, 1,4-hexanediyl, 1,5-hexanediyl, 1,6-hexanediyl, 2,2-hexanediyl, 2,3-hexanediyl, 2,4-hexanediyl, 2,5-hexanediyl, 3,3-hexanediyl, 2-methyl-1,1-pentanediyl, 3-methyl-1,1-pentanediyl, 2-methyl-1,2-pentanediyl, 2-methyl-1,3-pentanediyl, 2-methyl-1,4-pentanediyl, 2-methyl-2,2-pentanediyl, 2-methyl-2,3-pentanediyl, 2-methyl-2,4-pentanediyl, 2,2-dimethyl-1,1-butanediyl, 2,2-dimethyl-1,2-butanediyl, 2,2-dimethyl-1,3-butanediyl, 3,3-dimethyl-1,1-butanediyl, 3,3-dimethyl-1,2-butanediyl, 3,3-dimethyl-2,2-butanediyl, 1,1-dimethyl-2,3-butanediyl, 3,3-dimethyl-2,2-butanediyl, and the like; isomers of octanediyl, decanediyl, undecanediyl, dodecanediyl, hexadecanediyl, octadecanediyl, icosananediyl, and docosananediyl; and substituted and unsubstituted cyclopropanediyl, cyclobutanediyl, cyclopentanediyl, cyclohexanediyl, wherein substituents may be the points of radical attachment, such as in 1,4-dimethylenecyclohexane, or may include branched and straight chain alkyl, cycloalkyl, and the like. Additionally, the spacer group S may be selected from one or more diradicals comprising polyalkyleneoxy units, such as ethyleneoxy, 1,2-propyleneoxy, 1,3-propyleneoxy, 1,2-butyleneoxy, 1,4-butyleneoxy, 1,6-hexyleneoxy, and the like; and a combination comprising at least one of these.

Specific examples of useful aliphatic diols include ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; alicyclic alcohols such as 1,3-cyclobutanediol, 2,2,4,4-tetramethylcyclobutanediol, 1,2-cyclopentanediol, 1,2-cyclohexanediol, 1,3-cyclohexanediol, 1,4-cyclohexanediol, 1,4-dimethylolcyclohexane, and the like; branched acyclic diols such as 2,3-dimethyl-2,3-butanediol (pinacol), and 2-methyl-2,4-pentanediol (hexylene glycol); and polyalkyleneoxy-containing alcohols such as polyethylene glycol, polypropylene glycol, block or random poly(ethyleneglycol-co-propyleneglycols), and diols of copolymers containing polyalkyleneoxy-groups. Useful polyols may include polyaryleneoxy compounds such as polyhydroxystyrene; alkyl polyols such as polyvinylalcohol, polysaccharides, and esterified polysaccharides. A combination comprising at least one of the foregoing may also be useful. Specifically useful diols include 2-methyl-2,4-pentanediol (hexylene glycol), polyethylene glycol, and polypropylene glycol.

Useful aliphatic ethers may include alkoxy-substituted cyclic or acyclic alkanes such as, for example, 1,2-dialkoxyethanes, 1,2-dialkoxypropanes, 1,3-dialkoxypropanes, alkoxycyclopentanes, alkoxycyclohexanes, and the like. Ester compounds (—COOR) may be useful as stabilizers wherein R may be a substituted or unsubstituted, aromatic or aliphatic, hydrocarbon and the parent carboxy compound may likewise be substituted or unsubstituted, aromatic or aliphatic, and/or mono- or polyfunctional. When present, substituents may include, for example, $C_1$-$C_8$ alkyl, $C_1$-$C_8$ alkyl ether, $C_6$-$C_{20}$ aryl, and the like. Esters which have proven useful include tetrakis(methylene[3,5-di-t-butyl-4-hydroxy-hydrocinnamate])methane, 2,2'-oxamido bis(ethyl 3-(3,5-di-t-butyl-4-hydroxyphenyl)propionate, and trifunctional hindered phenolic ester compounds such as GOOD-RITE® 3125, available from B.F. Goodrich in Cleveland Ohio.

Diketone compounds may also be used, specifically those having two carbonyl functional groups and separated by a single intervening carbon atoms such as, for example 2,4-pentadione.

Sulfur-containing compounds, useful for use as stabilizing additives, can include thiols, thioethers and cyclic thioethers. Thiols include, for example, 2-mercaptobenzothiazole; thioethers include dilaurylthiopropionate; and cyclic thioethers include 1,4-dithiane, 1,4,8,11-tetrathiocyclotetradecane. Cyclic thioethers containing more than one thioether group are useful, specifically those having a single intervening carbon between two thioether groups such as in, for example, 1,3-dithiane. The cyclic ring may contain oxygen or nitrogen members.

Aryl or alkyl sulfone stabilizing additives of general structure R—S(O)$_2$—R' may also be used, where R and R' comprise $C_1$-$C_{20}$ alkyl, $C_6$-$C_{20}$ aryl, $C_1$-$C_{20}$ alkoxy, $C_6$-$C_{20}$ aryloxy, substituted derivatives thereof, and the like, and wherein at least one of R or R' is a substituted or unsubstituted benzyl. When present, substituents may include, for example, $C_1$-$C_8$ alkyl, $C_1$-$C_8$ alkyl ether, $C_6$-$C_{20}$ aryl, and the like. An example of a specifically useful sulfone is benzylsulfone.

Alkenes may be used as stabilizing additives. Useful alkenes may include olefins of general structure RR'C=CR''R''' wherein R, R', R'', and R''' may each individually be the same or different and may be selected from hydrogen, $C_1$-$C_{20}$ alkyl, $C_1$-$C_{20}$ cycloalkyl, $C_1$-$C_{20}$ alkenyl, $C_1$-$C_{20}$ cycloalkenyl, $C_6$-$C_{20}$ aryl, $C_6$-$C_{20}$ arylalkyl, $C_6$-$C_{20}$ alkylaryl, $C_1$-$C_{20}$ alkoxy, $C_6$-$C_{20}$ aryloxy and substituted derivatives thereof. When present, substituents may include, for example, $C_1$-$C_8$ alkyl, $C_1$-$C_8$ alkyl ether, $C_6$-$C_{20}$ aryl, and the like. The olefins may be acyclic, exocyclic, or endocyclic. Examples of specifically useful alkenes include 1,2-diphenyl ethane, allyl phenol, 2,4-dimethyl-1-pentene, limonene, 2-phenyl-2-pentene, 2,4-dimethyl-1-pentene, 1,4-diphenyl-1,3-butadiene, 2-methyl-1-undecene, 1-dodecene, and the like, or a combination comprising at least one of the foregoing.

Hydroaromatic compounds may also be useful as stabilizing additives, including partially hydrogenated aromatics, and aromatics in combination with an unsaturated ring. Specific aromatics include benzene and/or naphthalene based systems. Examples of hydroaromatic compounds include indane, 5,6,7,8-tetrahydro-1-naphthol, 5,6,7,8-tetrahydro-2-naphthol, 9,10-dihydroanthracene, 9,10-dihydrophenanthrene, 1-phenyl-1-cyclohexane, 1,2,3,4-tetrahydro-1-naphthol, and the like, or a combination comprising at least one of the foregoing.

Diethers, including hydrogenated and nonhydrogenated, and substituted and unsubstituted pyrans, may also be used as stabilizing additives. When present, substituents may include $C_1$-$C_8$ alkyl, $C_1$-$C_8$ alkyl ether, or $C_6$-$C_{20}$ aryl. The pyrans may have substituents including $C_1$-$C_{20}$ alkyl, $C_6$-$C_{20}$ aryl, $C_1$-$C_{20}$ alkoxy, or $C_6$-$C_{20}$ aryloxy, and which may be positioned on any carbon of the pyran ring. Specifically useful substituent groups include $C_1$-$C_{20}$ alkoxy or $C_6$-$C_{20}$ aryloxy, located on the ring at the six position. Hydrogenated pyrans are specifically useful. Examples of diethers include dihydropyranyl ethers and tetrahydropyranyl ethers.

Nitrogen compounds which may function as stabilizers include high molecular weight oxamide phenolics, for example, 2,2-oxamido bis-[ethyl 3-(3,5-di-tert-butyl-4-hydroxyphenyl)propionate], high molecular weight oxalic anilides and their derivatives, and amine compounds such as thiourea.

Ionizing radiation stabilizing additives are typically used in amounts of 0.001 to 1 wt %, specifically 0.005 to 0.75 wt %, more specifically 0.01 to 0.5 wt %, and still more specifically 0.05 to 0.25 wt %, based on the total weight of thermoplastic polymer, black dye, and fluorescent dye. In an embodiment, a specifically useful ionizing radiation stabilizing additive is an aliphatic diol.

While it is contemplated that other resins and or additives may be used in the thermoplastic compositions described herein, such additives while desirable in some embodiments are not essential. Thus, in an embodiment, a thermoplastic composition consists essentially of 50 to 99.98 wt % of a thermoplastic polymer, 0.01 to 25 wt % of black dye, and 0.01 to 25 wt % of fluorescent dye, wherein each of the foregoing weight percentages is based on the combined weight of the thermoplastic polymer, the black dye, and the fluorescent dye, excluding any other additives and/or fillers. Also, in an embodiment, a thermoplastic polymer specifically useful for use with the black dye and fluorescent dye includes polycarbonate-type resins as described herein (homopolycarbonates, copolycarbonates, polyester-polycarbonates, polysiloxane-polycarbonates, and combinations comprising at least one of the foregoing polycarbonate-type resins), including blends of polycarbonate-type resins with polyesters. Thus, in a specific embodiment, the thermoplastic composition comprises a polycarbonate-type resin, black dye, and fluorescent dye.

In a further embodiment, the thermoplastic composition may comprise an additive including optical effects filler, antioxidant, heat stabilizer, light stabilizer, ultraviolet light absorber, plasticizer, mold release agent, lubricant, antistatic agent, flame retardant, anti-drip agent, gamma stabilizer, or a combination comprising at least one of the foregoing additives.

The thermoplastic composition may be manufactured by methods generally available in the art, for example, in one embodiment, in one manner of proceeding, powdered polycarbonate, aromatic sulfonate compound, and other optional components including ionizing radiation stabilizing additive and/or hydrolysis stabilizer are first blended, in a HENSCHEL-Mixer® high speed mixer. Other low shear processes including but not limited to hand mixing may also accomplish this blending. The blend is then fed into the throat of an extruder via a hopper. Alternatively, one or more of the components may be incorporated into the composition by feeding directly into the extruder at the throat and/or downstream through a sidestuffer. Additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

In a specific embodiment, a method of preparing a thermoplastic composition comprises melt combining a thermoplastic polymer, a black dye, and a fluorescent dye. The melt combining can be done by extrusion. In an embodiment, the proportions of thermoplastic polymer, black dye, and fluorescent dye are selected such that the optical properties of the thermoplastic composition are maximized while mechanical performance is at a desirable level. In a further specific embodiment, the thermoplastic polymer comprises a polycarbonate-type polymer as defined hereinabove. In an embodiment, a method of preparing a thermoplastic composition comprises melt blending a masterbatch comprising thermoplastic polymer, black dye, and fluorescent dye, with an additional thermoplastic polymer. In an embodiment, the proportions of thermoplastic polymer, black dye, and fluorescent dye are selected such that the optical properties of the thermoplastic composition are maximized while mechanical performance is at a desirable level.

In a specific embodiment, the extruder is a twin-screw extruder. The extruder is typically operated at a temperature of 180 to 385° C., specifically 200 to 330° C., more specifically 220 to 300° C., wherein the die temperature may be different. The extruded thermoplastic composition is quenched in water and pelletized.

Shaped, formed, or molded articles comprising the thermoplastic compositions are also provided. The thermoplastic compositions may be molded into useful shaped articles by a variety of means such as injection molding, extrusion, rotational molding, blow molding and thermoforming. In a specific embodiment, molding is done by injection molding. Desirably, the thermoplastic composition has excellent mold filling capability.

The thermoplastic composition is useful to form an article such as, for example, an infrared-transparent window or infrared transparent housing for use in a small, portable electronic device. The electronic device may have an infrared transmitter, infrared receiver, or both an infrared transmitter and infrared receiver located inside the electronic device. The article prepared using the thermoplastic composition, e.g., window, is not perceptible in the electronic device. As used herein, "not perceptible" means not observed upon viewing the electronic device using the naked eye at a distance of greater than or equal to 30 centimeters under natural daylight conditions. Exemplary electronic devices that may incorporate an article formed using the thermoplastic composition include, but are not limited to, calculators, remote controls, multi-functional cellular telephones, personal digital assistants (PDAs), laptop computers, wireless mouses, computer keyboards, on-board navigation devices for automobiles or other vehicles, lavatory sensors, security sensors, and the like.

The thermoplastic composition is further illustrated by the following non-limiting examples.

All thermoplastic compositions were compounded on a Werner & Pfleiderer co-rotating twin screw extruder (Length/Diameter (L/D) ratio=30/1, vacuum port located near die face). The twin-screw extruder had enough distributive and dispersive mixing elements to produce good mixing of the polymer compositions. The compositions were subsequently molded according to ISO 294 on a Husky or BOY injection-molding machine. Compositions were compounded and molded at a temperature of 250 to 330° C., though it will be recognized by one skilled in the art that the method is not limited to these temperatures.

Thermoplastic compositions for the examples (abbreviated Ex. in the following tables) and comparative examples (abbreviated CEx. in the following tables) were prepared using the components shown in Table 1. The polymers and dyes were blended in a powder mixer, extruded on a twin-screw extruder, and injection molded into flat, rectangular plaques of 2.0±0.12 mm thickness, using the equipment described above. The resulting molded plaques were tested for transparency and surface reflectance using a GretagMacbeth CE-7000A spectrophotometer, and transmission spectral data was collected over a range of data from 380 to 1,000 nm according to ASTM D1003-00, and surface reflectance was measured according to ASTM E1331-04

TABLE 1

| Acronym | Material | Trade Name | Supplier |
| --- | --- | --- | --- |
| PC | Poly(bisphenol-A carbonate) | Lexan ®, grade 100 | GE Plastics |

TABLE 1-continued

| Acronym | Material | Trade Name | Supplier |
|---|---|---|---|
| PC/PESTR | PC/Polyester | Xylex ® X7300 | GE Plastics |
| PBT | Polybutylene terephthalate | Valox ® 210SEO | GE Plastics |
| PC/ABS | Poly(bisphenol-A carbonate) blend with Acrylonitrile-Butadiene-Styrene terpolymer | Cycoloy ® C6200 | GE Plastics |
| GPPS | "GP" Polystyrene | Dicstyrene ® CR-3500 | Dainippon Ink & Chemical (DIC) |
| PS | Polystyrene | PS H52 | Idemitsu |
| PE | Low Density Polyethylene | DNDJ-0405 | Nippon Unicar Company Ltd. |
| PP | Polypropylene | PD403 | Montell Polyolefins |
| PEI | Polyetherimide | UItem ® 1000LC | GE Plastics |
| PPO/PS | Polyphenylene oxide-polystyrene blend | Noryl ® SE90 | GE Plastics |
| DY201 | Disperse Yellow 201 | Macrolex ® Yellow 6G | Lanxess |
| SB104 | Solvent Blue 104 | Sandoplast ® Blue 2B | Clariant |
| SG3 | Solvent Green 3 | Macrolex ® Green 5B | Lanxess |
| SR135 | Solvent Red 135 | Macrolex ® Red EG | Lanxess |
| SR179 | Solvent Red 179 | Macrolex ® Red E2G | Lanxess |
| CB | Carbon Black (pigment) | Black Pearls ® 800 | Cabot |
| PG7 | Pigment Green 7 | Haliogen ® Green K8730 | BASF |
| PR149 | Pigment Red 149 | Paliogen ® Red K3580 | BASF |
| MGG | Solvent Green 28 | Macrolex ® Green G | Lanxess |
| DRH5B | Solvent Red 5 | Diaresin ® Red H5B | Mitsubishi Chemical Co. |
| LFB650 | Fluorescent Brightener 31 (modified) | Lumogen ® F Blue 650 | BASF |
| LR305 | Perylene derivative | Lumogen ® Red 305 | BASF |
| MFY10GN | Solvent Yellow 160:1 | Macrolex ® Fluorescent Yellow 10GN | Lanxess |
| UVOB | Optical brightener (fluorescent whitening agent) | Uvitex ® OB | Ciba Specialty Chemical |

Examples 1-9 and Comparative Examples 1-9. The above thermoplastic polymers, non-fluorescent dyes, fluorescent dyes, and pigments were compounded, extruded, and molded in various combinations as described in Tables 2 and 3, below. Table 2 describes Examples 1-9, and Table 3 describes Comparative Examples 1-9. The compositions in each of the Examples and Comparative Examples were blended based on 100 parts of thermoplastic polymer (i.e., base resin), and the quantities of dyes added are expressed in parts per hundred (phr). The % T of the base resin at 800 nm, the thermoplastic composition at 800 nm and 400-650 nm, and the % reflectance (% R) at 400-650 nm, are provided in the tables below.

TABLE 2

| Example No. | Base resin | Base resin % T (800 nm)[a] | Black dye(s) | Fluorescent dye(s) | Max % T (400–650 nm)[b] | % T (800 nm) | Max % R (400–650 nm)[c] | Appearance (bright color) |
|---|---|---|---|---|---|---|---|---|
| Ex. 1 | PC (Transparent) | 90% | SG3/0.15 pph SR135/0.015 pph SB104/0.05 pph | LFB650/0.16 pph UVOB/0.015 pph | 9% | 90% | 10% | Bright Blue |
| Ex. 2 | PC (Transparent) | 90% | SG3/0.03 pph SR179/0.10 pph | LR305/0.10 pph | 1% | 90% | 10% | Bright Red |
| Ex. 3 | PC (Transparent) | 90% | SG3/0.03 pph SR135/0.03 pph | MFY10GN/0.16 pph | 2% | 90% | 13% | Bright Green |
| Ex. 4 | PC/Polyester (Transparent) | 91% | SG3/0.03 pph SR135/0.03 pph | MFY10GN/0.16 pph | 1% | 91% | 12% | Bright Green |
| Ex. 5 | GPPS (Transparent) | 91% | SG3/0.03 pph SR135/0.03 pph | MFY10GN/0.16 pph | 4% | 89% | 12% | Bright Green |
| Ex. 6 | PP (Transparent) | 86% | SG3/0.03 pph SR135/0.03 pph | MFY10GN/0.16 pph | 7% | 85% | 7% | Green |
| Ex. 7 | PEI (Transparent) | 88% | SG3/0.03 pph SR135/0.03 pph | MFY10GN/0.16 pph | 2% | 85% | 11% | Bright Green |
| Ex. 8 | PS (Opaque) | 50% | SG3/0.03 pph SR135/0.03 pph | MFY10GN/0.16 pph | 0% | 50% | 19% | Bright Green |
| Ex. 9 | PE (LDPE, Translucent) | 70% | SG3/0.03 pph SR135/0.03 pph | MFY10GN/0.16 pph | 1% | 61% | 12% | Bright Green |

[a]Target percent transmittance (% T) is greater than 85% at 800 nm using 2.0 mm thick color chips.
[b]Target Maximum % T is less than 15% at 400 to 650 nm using 2.0 mm thick color chips.
[c]Target percent reflectance (% R) is greater than 7% at 400–650 nm using 2.0 mm thick color chips.

TABLE 3

| Example No. | Base resin | Base resin % T (800 nm)[a] | Black dye(s) | Fluorescent dye(s) | Max % T (400–650 nm)[b] | % T (800 nm) | Max % R (400–650 nm)[c] | Appearance (bright color) |
|---|---|---|---|---|---|---|---|---|
| CEx. 1 | PC/ABS (Opaque) | 42% | SG3/0.03 pph SR135/0.03 pph | MFY10GN/0.16 pph | 0% | 42% | 23% | Bright Green |
| CEx. 2 | PC/ABS (Opaque) | 42% | SG3/0.03 pph SR179/0.10 pph | LR305/0.10 pph | 0% | 41% | 13% | Bright Red |
| CEx. 3 | PPO/PS (Opaque) | 43% | SG3/0.03 pph SR135/0.03 pph | MFY10GN/0.16 pph | 0% | 41% | 18% | Bright Green |
| CEx. 4 | PBT (Opaque) | 11% | SG3/0.03 pph SR135/0.03 pph | MFY10GN/0.16 pph | 0% | 9% | 40% | Bright Green |
| CEx. 5 | PC (Transparent) | 90% | NONE | MFY10GN/0.10 pph | 87% | 88% | N/A | Transparent Yellow |
| CEx. 6 | PC (Transparent) | 90% | CB/0.05 pph (PIGMENT) | MFY10GN/0.10 pph | 0% | 0% | 11% | Bright Green |
| CEx. 7 | PC (Transparent) | 90% | PG7/0.05 pph PR149/0.05 pph (PIGMENT) | MFY10GN/0.10 pph | 3% | 14% | 14% | Bright Green |
| CEx. 8 | PC (Transparent) | 90% | SG3/0.025 pph SR135/0.025 pph | NONE | 3% | 90% | 6% | Dark Greenish Black |
| CEx. 9 | PC (Transparent) | 90% | SG3/0.025 pph SR135/0.025 pph | DY201/0.10 pph (NOT fluorescent) | 3% | 90% | 5% | Dark Greenish Black |

[a]Target percent transmittance (% T) is greater than 85% at 800 nm using 2.0 mm thick color chips.
[b]Target Maximum % T is less than 15% at 400 to 650 nm using 2.0 mm thick color chips.
[c]Target percent reflectance (% R) is greater than 7% at 400–650 nm using 2.0 mm thick color chips.

The data for Examples 1-9 (Table 2) show that the combinations of transparent thermoplastic polymers with a black dye combination and a fluorescent dye all show desired absorbance and reflectance properties. Examples 1-3 are respectively blue, red, and yellow fluorescent compositions with polycarbonate. The blue composition (Example 2) also included a fluorescent brightener to act as a synergist with the blue dye (LF650). Examples 4-7 (polycarbonate/polyester blend, polystyrene, polypropylene, and polyetherimide, respectively) also provided the desired performance for green compositions. Polypropylene and polyetherimide have slightly less transparency in the near IR, due to a slightly higher absorbance for the undyed polymer. Example 8 (opaque polystyrene) and Example 9 (translucent LDPE) each exhibit low transmission of the undyed polymer due to scattering, and hence relatively low transmission of the thermoplastic composition within the limitations disclosed herein. Such compositions can be useful in embodiments wherein a very high infrared transmission (i.e., greater than or equal to 80%) is not a necessary feature.

Comparative Examples 1-9 (Table 3) all universally show undesirable performance for some or all criteria, generally either too high an absorbance in the near IR, too low an absorbance in the visible region, or poor brightness of observed color (using the unaided eye). Comparative Examples 1-4 (PC/ABS, PC/ABS, PPE/polystyrene blend, and polybutylene terephthalate), all opaque compositions based on the thermoplastic polymer used, each show no transmission in the visible region, but low transmission in the near IR. Comparative Examples 6 and 7, both of which include black dye pigments (CEx 6—carbon black; CEx 7, pigment blend) also show very poor transmission in the near IR; however, it can be noted (from FIG. 1; see below) that the absorbance for this comparative example is greater than 50% when measured at a wavelength of greater than about 855 nm. It is believed that the pigments used scatter and/or absorb in the near IR which can significantly affect their performance, whereas the low transmission in Comparative Examples 1-4 is attributable to scattering of the incident light due to the opacity of the resins. Comparative Example 5 has poor absorbance in the visible region, due to the absence of the black dye component. Comparative Examples 8 (with no fluorescent dye) and 9 (with an additional dye that is non-fluorescent) both have desirable transmission in the near IR and in the visible region, but show poor brightness of color, and hence are not desirable.

Absorbance spectra for the Examples and Comparative Examples are provided in FIG. 1. It can be seen in the spectral data that the absorbances of Comparative Examples 1, 2, and 5-7 are all outlying curves which either do not have adequate absorbance in the visible range (400-650 mm), or inadequate transmission in the near IR (800 nm or greater). Examples 1-3, and Comparative Examples 8 and 9, each have desirable absorbances in the visible and near IR range. However, Comparative Examples 8 and 9 have poor brightness of color.

Photographs of the color chips corresponding to the absorbance spectra in FIG. 1 are shown in FIG. 2 for Examples 1-9, and Comparative Examples 1-9. It can be seen that the color presented by the chips under photographic conditions is excellent for Examples 1-5 and 7, and good for Example 6. Of the color appearance of the Comparative Examples 1-9, Comparative Examples 1-4, 6, and 7 are acceptable but have undesirable absorbance properties as described in FIG. 1. Comparative Example 5, the baseline with no black dye, is visibly transparent with no appreciable absorbance in the range 400-650 nm (note the horizontal black lines of the background visible through the chip). Comparative Examples 8 and 9 each have a dark green-black finish that is unaffected by the presence of a non-fluorescent dye (Comparative Example 9).

Compounds are described herein using standard nomenclature. A dash ("-") that is not between two letters or symbols is used to indicate a point of attachment for a substituent. For example, —CHO is attached through the carbon of the carbonyl(C=O) group. The singular forms "a," "an," and "the" include plural referents unless the context clearly dictates otherwise. The endpoints of all ranges reciting the same characteristic or component are independently combinable and inclusive of the recited endpoint. All references are incorporated herein by reference. The terms "first," "second," and the like herein do not denote any order, quantity, or importance, but rather are used to distinguish one element from another.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

We claim:

1. A thermoplastic composition comprising:
a thermoplastic polymer, and
a dye combination comprising
   a black dye, and
   a fluorescent dye which fluoresces in the visible region of the spectrum,
wherein the black dye is non-fluorescent, and wherein a molded article having a thickness of 2.0 millimeters and consisting of the thermoplastic polymer, the black dye, and the fluorescent dye, has
   a percent transmission of infrared light according to ASTM D1003-00 of greater than or equal to 50%, when measured at a wavelength of 800 to 1,100 nm, and
   a percent transmission of visible light, according to ASTM D1003-00 of less than or equal to 15%, when measured at a wavelength of 400 to 650 nm; and
wherein a molded article consisting of the thermoplastic polymer, black dye, and fluorescent dye has, when measured according to ASTM E1331-04, a percent reflectance (% R) of greater than 7% at a wavelength of 400 to 650 nm.

2. The thermoplastic composition of claim 1 wherein the weight ratio of black dye to fluorescent dye is 1:99 to 99:1.

3. The thermoplastic composition of claim 1 wherein the black dye is present in an amount of 0.01 to 25 w %, based on the total weight of the thermoplastic polymer, black dye, and fluorescent dye.

4. The thermoplastic composition of claim 1, wherein the black dye comprises a combination of dyes.

5. The thermoplastic composition of claim 4, wherein the black dye comprises a combination comprising two or more dyes which are complementary to each other.

6. The thermoplastic composition of claim 5 wherein the black dye comprises a combination of Solvent Green 3 and Solvent Red 135.

7. The thermoplastic composition of claim 1 wherein the fluorescent dye is present in an amount of 0.01 to 25 wt % of the total weight of the thermoplastic polymer, black dye, and fluorescent dye.

8. The thermoplastic composition of claim 7, wherein the fluorescent dye comprises rhodamines, fluoresceins, coumarins, naphthalirnides, benzoxanthenes, perylenes, pyrenes, acridines, or a combination comprising at least one of the foregoing dyes.

9. The thermoplastic composition of claim 8, wherein the fluorescent dye comprises Rhodamine BDC (C.I. 45,170), Rhodamine 6GDN extra (C.I. 45,160; Red 480), Rhodamine F5G (Red 482), Rhodamine FB (Red 540), and Rhodamine F3B (C.I. 45,175), Lumogen® F Blue 650, Lumogen® F Red 305, Lumogen® F Yellow 083, Lumogen® F Violet 570, Lumogen® F Green 850, Macrolex® Fluorescent Yellow 10GN (C.I. Solvent Yellow 160:1), Macrolex® Red G, Irgalite® Violet M, Maxilon® Brilliant Flavine 10GFF, Maxion® Black FBL-01, Maxilon® Black RM-01, Maxilon® Blue 5G, Maxilon® Blue 5G-01, Maxilon® Blue GRL/Pearl, Maxilon® Blue GRL Granulated, Maxilon® Blue GRL L, Maxilon® Blue M-G, Maxilon® Blue TRL Liquid, Maxilon® Golden Yellow GL Pearls, Maxilon® Navy FRL-02, Maxilon® Red GRL-01 Pearl, Maxilon® Red GRL-L, Maxilon® Red GRL Pearls, Maxilon® Red M-4GL, Maxilon® Yellow M-3RL, Maxilon® Yellow M-4GL, Hostasol® Red 5B (Vat Red 41), Hostasol® Red GG (Solvent Orange 63), and Hostasol® Yellow 3G (Solvent Yellow 98), Fluorescent yellow F6PN, Yellow Y toner, Fluorescent Red 66, fluorescein, 9-aminoacridine, or a combination comprising at least one of the foregoing fluorescent dyes.

10. The thermoplastic composition of claim 1, wherein the thermoplastic polymer comprises a polycarbonate, a polyester, a polyetherimide, a polysiloxane-polyetherimide, a polyphenylene ether, a polyolefin, a polystyrene, an impact modified poly(alkenylaromatic) copolymer, a poly(meth) acrylate, or a combination comprising at least one of the foregoing thermoplastic polymers.

11. The thermoplastic composition of claim 10, wherein the thermoplastic composition comprises polycarbonates comprising homopolycarbonates, copolycarbonates, polyester-polycarbonates, polysiloxane-polycarbonates, or a combination comprising at least one of the foregoing polycarbonates.

12. The thermoplastic composition of claim 11, further comprising a polyester.

13. The thermoplastic composition of claim 1, further comprising a fluorescence brightener.

14. The thermoplastic composition of claim 1, further comprising an additive including filler, antioxidant, heat stabilizer, light stabilizer, ultraviolet light absorber, plasticizer, mold release agent, lubricant, antistatic agent, flame retardant, anti-drip agent, gamma stabilizer, or a combination comprising at least one of the foregoing additives, where the additive is present in amount that does not significantly adversely affect the desired properties of the thermoplastic composition.

15. The thermoplastic composition of claim 1, wherein a molded article having a thickness of 2.0 millimeters and consisting of the thermoplastic polymer, the black dye, and the fluorescent dye, has a percent transmission of infrared light according to ASTM D1003-00 of greater than or equal to 50%, when measured at a wavelength of 800 to 1,000 nm.

16. The thermoplastic composition of claim 1 wherein a molded article having a thickness of 2.0 millimeters and consisting of the thermoplastic polymer, the black dye, and the fluorescent dye, has a percent transmission of infrared light according to ASTM D1003-00 of greater than or equal to 80%, when measured at a wavelength of 800 to 1,100 nm.

17. The thermoplastic composition of claim 1, wherein the dye package is compounded with the thermoplastic polymer as a masterbatch.

18. The thermoplastic composition of claim 15 wherein the thermoplastic composition comprises the masterbatch blended with additional thermoplastic polymer.

19. A thermoplastic composition consisting essentially of:
a thermoplastic polymer, and
a dye combination comprising
a black dye, and
a fluorescent dye which fluoresces in the visible region of the spectrum,
wherein the black dye is non-fluorescent, and wherein a molded article having a thickness of 2.0 millimeters and consisting of the thermoplastic polymer, the black dye, and the fluorescent dye, has
   a percent transmission of infrared light according to ASTM D1003-00 of greater than or equal to 50%, when measured at a wavelength of 800 to 1,100 nm, and a percent transmission of visible light, according to ASTM D1003-00 of less than or equal to 15%, when measured at a wavelength of 400 to 650 nm; and wherein a molded article consisting of the thermoplastic polymer, black dye, and fluorescent dye has, when measured according to ASTM E1331-04, a percent reflectance (% R) of greater than 7% at a wavelength of 400 to 650 nm.

20. An article comprising:

a thermoplastic polymer, and a dye combination comprising a black dye, and a fluorescent dye which fluoresces in the visible region of the spectrum, wherein the black dye is non-fluorescent, and wherein a molded article having a thickness of 2.0 millimeters and consisting of the thermoplastic polymer, the black dye, and the fluorescent dye, has a percent transmission of infrared light according to ASTM D1003-00 of greater than or equal to 50%, when measured at a wavelength of 800 to 1,100 nm, and a percent transmission of visible light, according to ASTM D1003-00 of less than or equal to 15%, when measured at a wavelength of 400 to 650 nm; and wherein a molded article consisting of the thermoplastic polymer, black dye, and fluorescent dye has, when measured according to ASTM E1331-04, a percent reflectance (% R) of greater than 7% at a wavelength of 400 to 650 nm.

21. The article of claim 20, wherein the article is an infrared-transparent window or infrared-transparent housing for an electronic device.

22. The article of claim 21, wherein the electronic device has an infrared transmitter, infrared receiver, or both an infrared transmitter and infrared receiver located inside the electronic device.

23. The article of claim 21, wherein the infrared-transparent window is not perceptible in the electronic device.

24. The article of claim 21, wherein the electronic device is a calculator, a remote control, a multi-functional cellular telephone, a personal digital assistant (PDA), a laptop computer, a wireless mouse, a computer keyboard, an on-board navigation device for an automobile or other vehicle, a lavatory sensor, or a security sensor.

* * * * *